US012783436B2

(12) United States Patent
Kim et al.

(10) Patent No.: US 12,783,436 B2
(45) Date of Patent: Nov. 3, 2026

(54) MEMORY MODULE HAVING SYNCHRONOUS ARBITRATOR AND METHOD OF OPERATING THE SAME

(71) Applicant: SAMSUNG ELECTRONICS CO., LTD., Suwon-si (KR)

(72) Inventors: Yuna Kim, Suwon-si (KR); Youngtaek Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/011,154

(22) Filed: Jan. 6, 2025

(65) Prior Publication Data

US 2025/0390450 A1 Dec. 25, 2025

(30) Foreign Application Priority Data

Jun. 24, 2024 (KR) ........................ 10-2024-0081906

(51) Int. Cl.
*G06F 13/16* (2006.01)
*G06F 13/18* (2006.01)

(52) U.S. Cl.
CPC ...... *G06F 13/1689* (2013.01); *G06F 13/1642* (2013.01); *G06F 13/18* (2013.01)

(58) Field of Classification Search
CPC ............. G06F 13/1689; G06F 13/1642; G06F 13/18; G06F 13/1684; G11C 5/04; G11C 7/1063; G11C 7/1093
(Continued)

(56) References Cited

U.S. PATENT DOCUMENTS

| | | | |
|---|---|---|---|
| 7,165,133 | B2 | 1/2007 | Takeuchi et al. |
| 9,965,222 | B1 | 5/2018 | Brandl et al. |
| 10,176,132 | B2 | 1/2019 | Chellappan et al. |

(Continued)

FOREIGN PATENT DOCUMENTS

| | | | |
|---|---|---|---|
| JP | 2023-539737 | A | 9/2023 |
| KR | 10-2017-0104110 | A | 9/2017 |

(Continued)

OTHER PUBLICATIONS

Communication dated Jul. 30, 2025 issued by the European Patent Office in European Patent Application No. 25165994.2.

(Continued)

*Primary Examiner* — Hosain T Alam
*Assistant Examiner* — Zubair Ahmed
(74) *Attorney, Agent, or Firm* — Sughrue Mion, PLLC

(57) ABSTRACT

A memory module, including: a first synchronization control circuit configured to store a first write activation signal, a first write address signal, and a first write data signal; a second synchronization control circuit configured to store a second write activation signal, a second write address signal, and a second write data signal; a third synchronization control circuit configured to store a third write activation signal, a third write address signal, and a third write data signal; and a fixed priority module configured to: output a write activation signal received from the first synchronization control circuit, the second synchronization control circuit, or the third synchronization control circuit as a register write activation signal, output a write address signal received from the first synchronization control circuit, the second synchronization control circuit, or the third synchronization control circuit as a register write address signal, and output a write data signal received from the first synchronization control circuit, the second synchronization control
(Continued)

circuit, or the third synchronization control circuit as a register write data signal.

20 Claims, 17 Drawing Sheets

(58) Field of Classification Search
USPC .................................................. 711/154, 100
See application file for complete search history.

(56) References Cited

U.S. PATENT DOCUMENTS 10,684,969 B2 6/2020 Magro et al.
2013/0097390 A1* 4/2013 Hatula ................ G06F 13/1663 711/149
2015/0019803 A1* 1/2015 Miller ................... G06F 3/0611 711/125
2017/0255398 A1 9/2017 Niu et al.
2022/0058141 A1 2/2022 Magro et al.
2022/0129201 A1* 4/2022 Bamdhamravuri ...... G11C 5/04
2023/0376211 A1 11/2023 Koo
2024/0134574 A1 4/2024 Bamdhamravuri

FOREIGN PATENT DOCUMENTS

KR 10-2442078 B1 9/2022
KR 10-2444201 B1 9/2022

OTHER PUBLICATIONS

Rigaud et al., "Modeling and Design of Asynchronous Priority Arbiters for On-Chip Communication Systems", FIP International Federation for Information Processing, 2002, pp. 313-324, doi: 10.1007/978-0-387-35597-9_40.

* cited by examiner

MEMORY MODULE HAVING SYNCHRONOUS ARBITRATOR AND METHOD OF OPERATING THE SAME

CROSS-REFERENCE TO RELATED APPLICATION

This application is based on and claims priority under 35 USC § 119 to Korean Patent Application No. 10-2024-0081906 filed on Jun. 24, 2024, in the Korean Intellectual Property Office, the disclosure of which is incorporated by reference herein in its entirety.

BACKGROUND

The disclosure relates to a memory module having a synchronous arbitrator and a method of operating the same.

In general, a Register Clock Driver (RCD) may play an important role in high-speed digital circuits, for example in Dynamic Random Access Memory (DRAM) modules, and may be used in servers, data centers, and high-performance computing systems. The RCD may distribute a clock signal of a system to multiple memory chips. This may ensure that all memory chips receive the same clock signal and operate in synchronization. The RCD may buffer data signals to maintain signal integrity and improve memory module performance. This may be important to minimize signal distortion during high-speed data transmissions. The RCD may also buffer and distribute address and control signals so that each DRAM chip within the memory module may receive the correct signals. Maintaining signal integrity may be important in high-speed data transmission environments. RCDs may reproduce signals to provide a strong signal, thereby reducing data transmission errors. Servers and high-performance computing systems often require multiple memory modules to be connected in parallel. RCDs may support this scalability, allowing multiple DRAM modules to operate reliably simultaneously. RCDs may also optimize power consumption, increasing efficiency of an overall system. This may be important in environments such as large data centers.

SUMMARY

Provided is a memory module and an operation thereof, enabling register access from three or more interfaces.

Additional aspects will be set forth in part in the description which follows and, in part, will be apparent from the description, or may be learned by practice of the presented embodiments.

In accordance with an aspect of the disclosure, a memory module includes: a first synchronization control circuit configured to store a first write activation signal, a first write address signal, and a first write data signal; a second synchronization control circuit configured to store a second write activation signal, a second write address signal, and a second write data signal; a third synchronization control circuit configured to store a third write activation signal, a third write address signal, and a third write data signal; and a fixed priority module configured to: output a write activation signal received from the first synchronization control circuit, the second synchronization control circuit, or the third synchronization control circuit as a register write activation signal, output a write address signal received from the first synchronization control circuit, the second synchronization control circuit, or the third synchronization control circuit as a register write address signal, and output a write data signal received from the first synchronization control circuit, the second synchronization control circuit, or the third synchronization control circuit as a register write data signal.

In accordance with an aspect of the disclosure, a method of operating a memory module includes: receiving a first register write command from an eFuse controller; receiving a second register write command from a host device using an in-band interface; and receiving a third register write command from the host device using a sideband interface, wherein register access is processed in order of the first register write command, the second register write command, and the third register write command.

In accordance with an aspect of the disclosure, a method of operating a memory module includes: receiving a first register write command corresponding to an eFuse controller;

receiving a second register write command corresponding to a host device using an in-band interface; and receiving a third register write command corresponding to the host device using a sideband interface, wherein register access is processed in an order of the first register write command, the third register write command, and the second register write command.

In accordance with an aspect of the disclosure, a memory module includes: a first rank comprising first memory devices; a second rank comprising second memory devices; a serial presence detection chip configured to store device information; a register clock driver configured to buffer clock signals and control external signals received from external devices; and a power management chip configured to provide power supply voltages corresponding to the first rank, the second rank, the serial presence detection chip, and the register clock driver, wherein the register clock driver includes: a first synchronization control circuit configured to store a first write activation signal, a first write address signal, and a first write data signal; a second synchronization control circuit configured to store a second write activation signal, a second write address signal, and a second write data signal; a third synchronization control circuit configured to store a third write activation signal, a third write address signal, and a third write data signal; and a fixed priority module configured to: output a write activation signal received from the first synchronization control circuit, the second synchronization control circuit, or the third synchronization control circuit as a register write activation signal, output a write address signal received from the first synchronization control circuit, the second synchronization control circuit, or the third synchronization control circuit as a register write address signal, and output a write data signal received from the first synchronization control circuit, the second synchronization control circuit, or the third synchronization control circuit as a register write data signal.

BRIEF DESCRIPTION OF DRAWINGS

The above and other aspects, features, and advantages of the certain embodiments of the present disclosure will be more apparent from the following description taken in conjunction with the accompanying drawings, in which.

DETAILED DESCRIPTION

Hereinafter, example embodiments are described clearly and in detail with reference to the accompanying drawings so that a person having ordinary skill in the art may more easily practice embodiments of the disclosure.

When accessing registers simultaneously from two or more interfaces, a register clock driver (RCD) according to an example embodiment may transmit a busy signal of a state controller to a fixed priority module. The fixed priority module may check the priority and stop sampling the synchronizer input (request) of the lower priority interface as a result of the check. Once the high priority access is over, the fixed priority module may begin sampling the synchronizer input of the next highest priority interface, thereby allowing register access. Therefore, only one access is delivered to the resource at a time.

All requests may go through the state controller, which may send a busy signal to the fixed priority module. The fixed priority module may determine the priority of the busy signal and transmit the busy signal to the synchronizer. Access signals to resources may be provided in the synchronizer. Only the synchronizer on the high-priority interface gets input sampling. This is because the access signal for only one interface is generated at a time. The fixed priority module may OR-operate the access signal of each interface and transmit the OR-operated signal to the resource. A response signal ack may be transmitted to the state controller at the same time as the synchronizer generates an access signal. In this case, the request operates as a 1-clock pulse. Therefore, pending processing for the same interface is possible according to the state controller.

Figure 1:
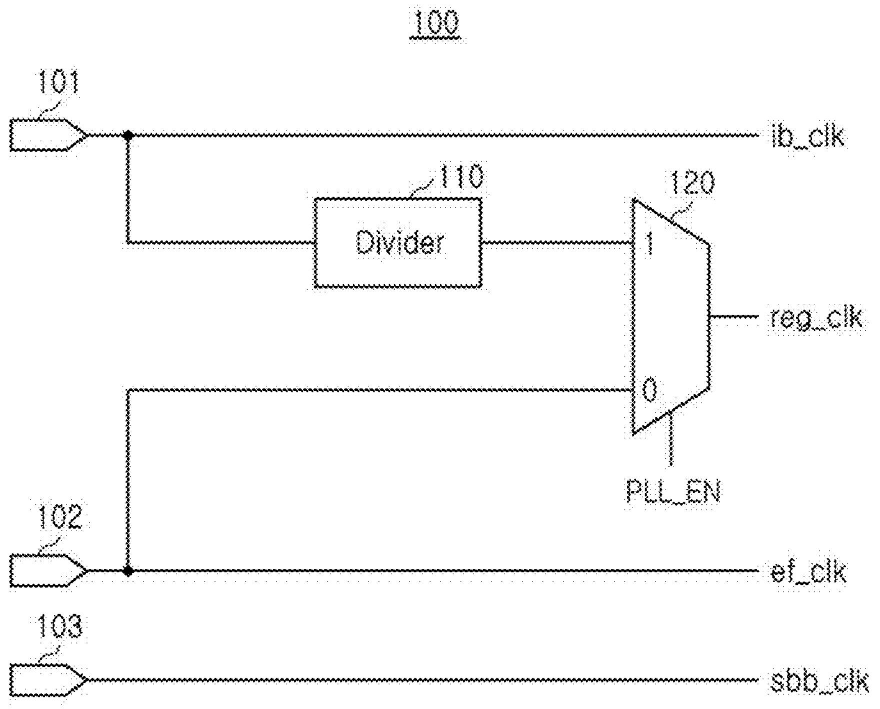
FIG. 1 is a diagram illustrating a clock group according to an example embodiment.

FIG. 1 is a diagram illustrating a clock group 100 according to an example embodiment. Referring to FIG. 1, the clock group 100 may include a divider 110 and a selector 120.

An in-band clock ib_clk may be received at the first terminal 101. An eFuse clock ef_clk may be received at the second terminal 102. A sideband bus clock sbb_clk may be received at the third terminal 103. According to embodiments, an eFuse may refer to a small (e.g., microscopic) fuse that may be included a computer chip to provide protection and to allow for the dynamic real-time reprogramming of the chip. In some embodiments, eFuses may allow for circuits on a chip to be changed or reconfigured while the chip is in operation.

The divider 110 may be configured to receive the in-band clock ib_clk from the first terminal 101 and distribute the received clock.

The selector 120 may output one of the divided clock of the divider 110 and the eFuse clock ef_clk from the second terminal 102, as a register clock reg_clk, in response to the clock activation signal PLL_EN. For example, if the clock activation signal PLL_EN corresponds to a logical value of one ('1') (e.g., a logical high value), the divided clock of the divider 110 may be output as the register clock reg_clk. However, if the clock activation signal PLL_EN corresponds to a logical value of zero ('0') (e.g., a logical low value), the eFuse clock ef_clk may be output as the register clock reg_clk.

Figure 2:
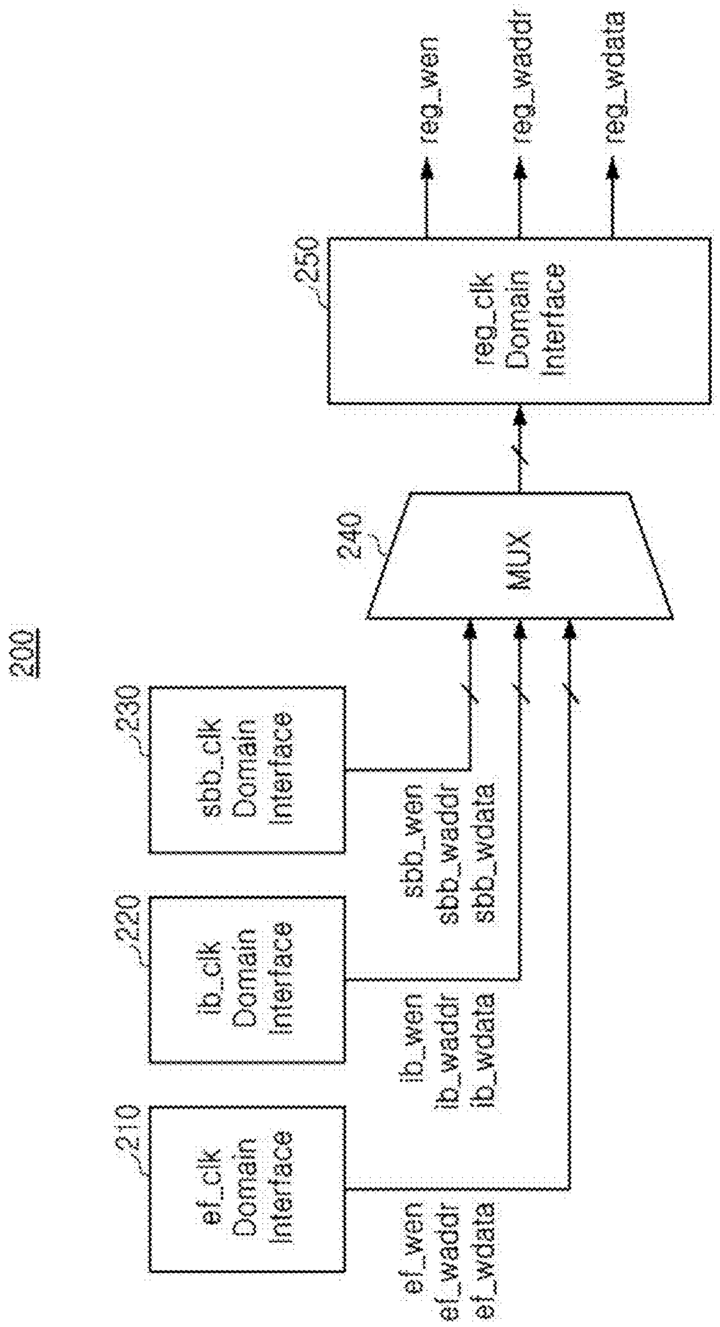
FIG. 2 is a diagram illustrating a register access interface circuit according to an example embodiment.

FIG. 2 is a diagram illustrating a register access interface circuit 200 according to an example embodiment. Referring to FIG. 2, a register access interface circuit 200 may include a first clock domain interface circuit 210, a second clock domain interface circuit 220, a third clock domain interface circuit 230, a multiplexer 240, and a register clock domain interface circuit 250.

The first clock domain interface circuit 210 may be configured to output a clock write activation signal ef_wen, a clock write address signal ef_waddr, and a clock write data signal ef_wdata corresponding to the eFuse clock ef_clk.

The second clock domain interface circuit 220 may be configured to output a clock write activation signal in_wen, a clock write address signal ib_waddr, and a clock write data signal ib_wdata corresponding to the in-band clock ib_clk.

The third clock domain interface circuit 230 may be configured to output a clock write activation signal sbb_wen, a clock write address signal sbb_waddr, and a clock write data signal sbb_wdata corresponding to the sideband bus clock sbb_clk.

The multiplexer 240 may be configured to output signals of any one of the first clock domain interface circuit 210, the second clock domain interface circuit 220, and the third clock domain interface circuit 230.

The register clock domain interface circuit 250 may be configured to output the output signals of the multiplexer 240 as a register write activation signal reg_wen, a register write address signal reg_waddr, and a register write data signal reg_wdata.

The first, second, and third clock domain interface circuits 210, 220, and 230 may use a synchronizer because register blocks and clock domains thereof are different. If the first, second, and third clock domain interface circuits 210, 220, and 230 do not access the register at the same time, the synchronized signal may be arbitrated by the multiplexer 240. However, the eFuse controller may be used by a vendor, and therefore some aspects or operations of the eFuse controller may be unknown to the host. Therefore, a case may occur where the host attempts to access the register through a sideband before an access by the eFuse controller is completed. In this case, access from low-priority interface circuits may be ignored. Also, if the host accesses the register in-band while accessing the register through the sideband, or if in-band access occurs when the processing for sideband register access in the internal block has not been completed, or vice versa, similarly, accesses from low-priority interface circuits may be ignored.

In this process, the synchronizer may be arbitrated by using a D flip-flop with asynchronous reset and may be set (active low-reset, active high-set) so that accesses are not ignored, and instead are processed sequentially. In addition, because in-band access may operate at high speed, a pending function may be added in case a re-access is attempted before the previous access is completed on the same interface in an arbitration situation.

Figure 3:
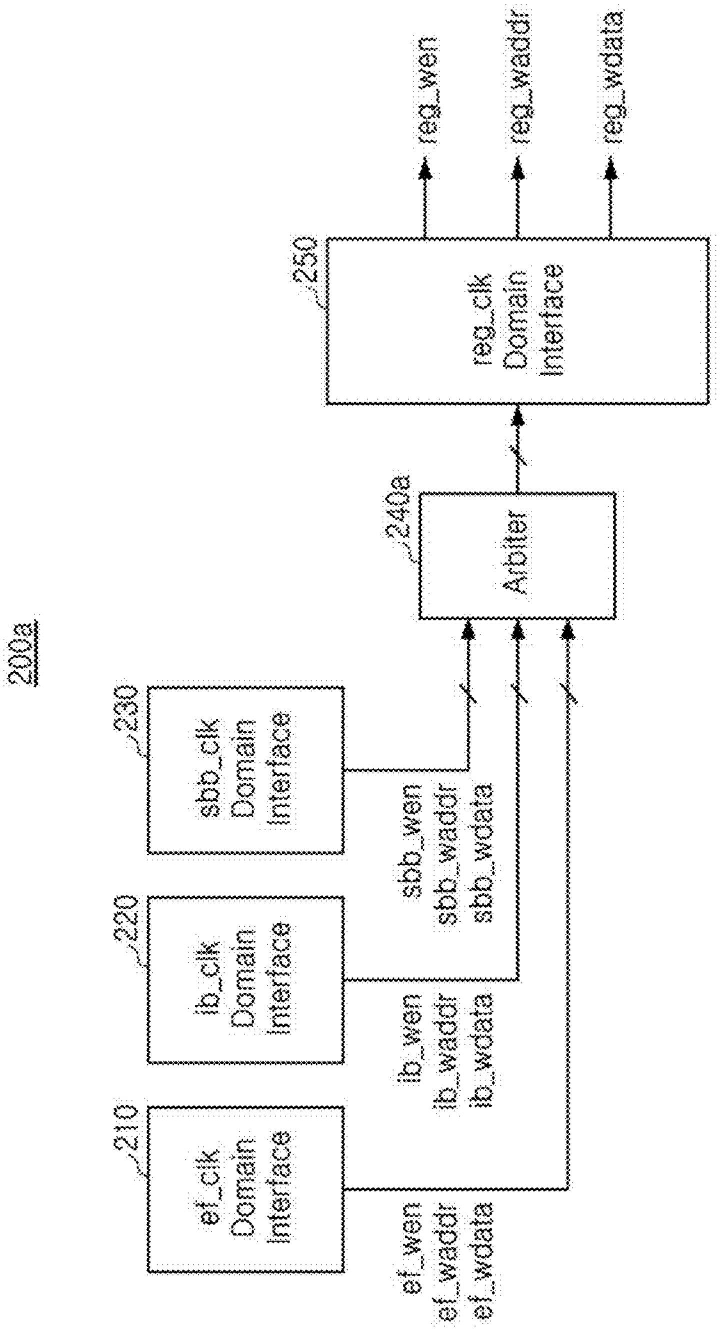
FIG. 3 is a diagram illustrating a register access interface circuit according to another embodiment.

FIG. 3 is a diagram illustrating a register access interface circuit 200*a* according to another embodiment. Referring to FIG. 3, the register access interface circuit 200*a* may be implemented by replacing the multiplexer 240 with a synchronous arbitrator 240*a*, compared to that of FIG. 2.

When the control signals of the first, second, and third clock domain interface circuits 210, 220, and 230 are transmitted to the synchronous arbitrator 240*a*, the signals may be transmitted to the register clock domain interface circuit 250 through arbitration in the synchronous arbitrator 240*a*.

Figure 4:
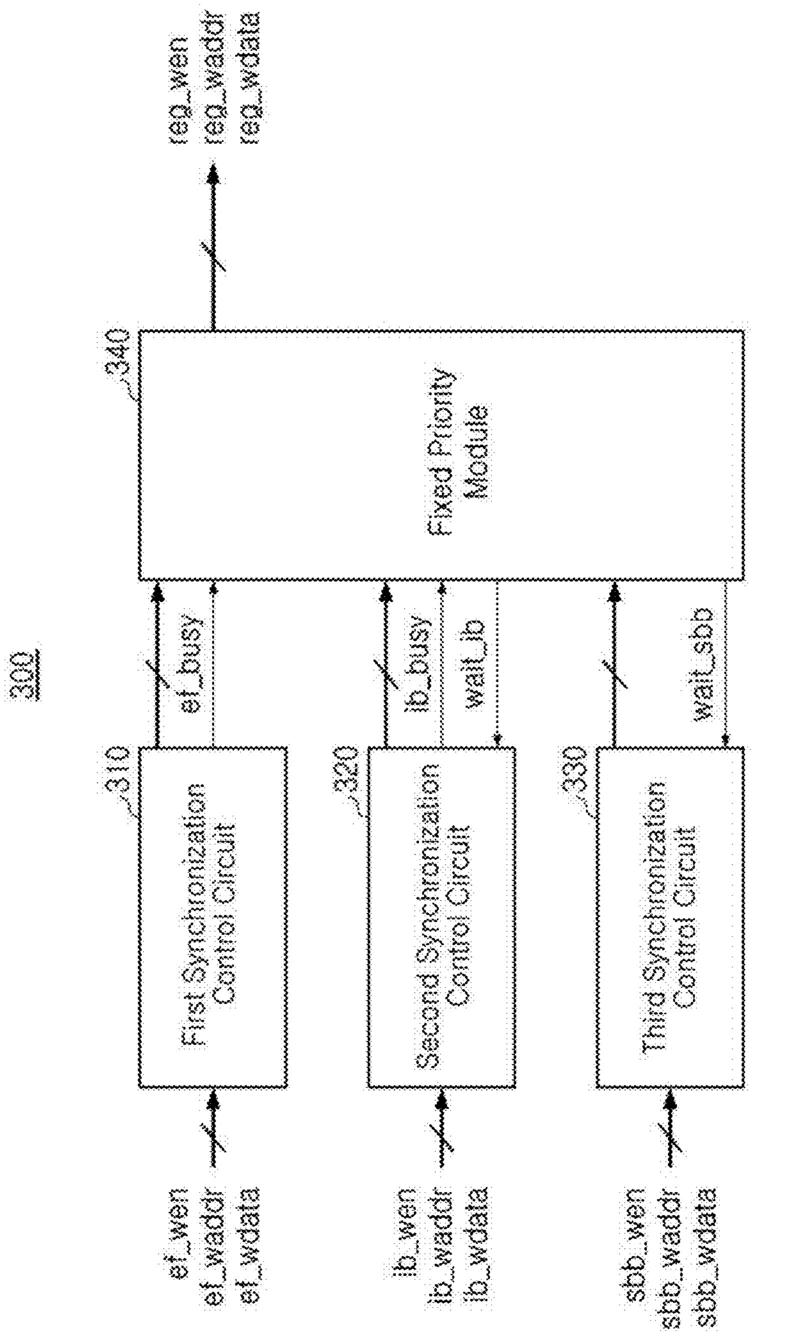
FIG. 4 is a diagram illustrating a synchronous arbitrator according to an example embodiment.

FIG. 4 is a diagram illustrating a synchronous arbitrator 300 according to an example embodiment. Referring to FIG. 4, the synchronous arbitrator 300 may include a first synchronization control circuit 310, a second synchronization control circuit 320, a third synchronization control circuit 330, and a fixed priority module 340.

The first synchronization control circuit 310 may be configured to store an eFuse write activation signal ef_wen, an eFuse write address signal ef_waddr, and an eFuse write data signal ef_wdata. In addition, the first synchronization control circuit 310 may transmit an eFuse write activation signal ef_wen, an eFuse write address signal ef_waddr, an eFuse write data signal ef_wdata, and an eFuse busy signal ef_busy to the fixed priority module 340.

The second synchronization control circuit 320 may be configured to store an in-band write activation signal ib_wen, an in-band write address signal ib_waddr, and an in-band write data signal ib_wdata. In addition, the second synchronization control circuit 320 may transmit an In-band write activation signal ib_wen, an in-band write address signal ib_waddr, an in-band write data signal ib_wdata, and an in-band busy signal ib_busy to the fixed priority module 340. Additionally, the second synchronization control circuit 320 may receive an in-band wait signal wait_ib from the fixed priority module 340.

The third synchronization control circuit 330 may be configured to store a sideband write activation signal sbb_wen, a sideband write address signal sbb_waddr, and a sideband write data signal sbb_wdata. Additionally, the third synchronization control circuit 330 may transmit a sideband write activation signal sbb_wen, a sideband write address signal sbb_waddr, and a sideband write data signal sbb_wdata to the fixed priority module 340. Additionally, the third synchronization control circuit 330 may receive a sideband wait signal wait_sbb from the fixed priority module 340.

The fixed priority module 340 may be configured to output any one of the signals received from the first to third synchronization control circuits 310, 320, and 330, as a register write activation signal reg_wen, a register write address signal reg_waddr, and a register write data signal reg_wdata. Additionally, the fixed priority module 340 may output an in-band wait signal wait_ib to the second synchronization control circuit 320 to wait for in-band signals according to the priority policy. Additionally, the fixed priority module 340 may output a sideband wait signal wait_sbb to the third synchronization control circuit 330 to wait for sideband signals according to the priority policy.

Figure 5:
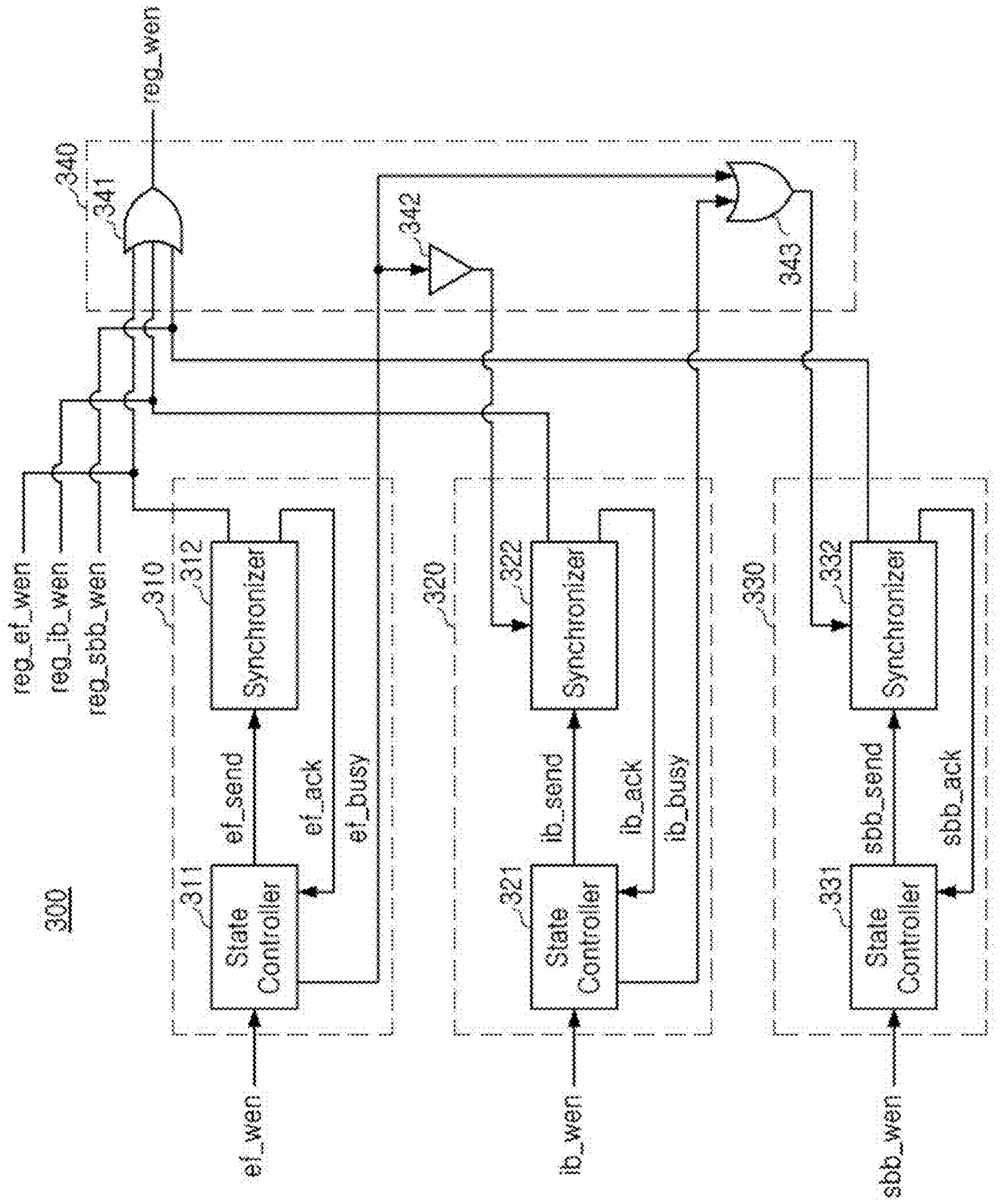
FIG. 5 is a diagram illustrating the synchronous arbitrator illustrated in FIG. 4 in more detail.

FIG. 5 is a diagram illustrating the synchronous arbitrator 300 illustrated in FIG. 4 in more detail. Referring to FIG. 5, the synchronous arbitrator 300 may include a first synchronization control circuit 310, a second synchronization control circuit 320, a third synchronization control circuit 330, and a fixed priority module 340, which show in detail the signal relationships between internal components.

The first synchronization control circuit 310 may include a first state controller 311 and a first synchronizer 312. The first state controller 311 may be configured to receive an eFuse write activation signal ef_wen and output an eFuse transmission signal ef_send to the first synchronizer 312. The first state controller 311 may receive an eFuse response signal ef_ack from the first synchronizer 312 and output an eFuse busy signal ef_busy to the fixed priority module 340. The first synchronizer 312 may be configured to output an eFuse register write activation signal reg_ef_wen in response to an eFuse transmission signal ef_send. The first synchronizer 312 may output an eFuse response signal ef_ack to the first state controller 311.

The second synchronization control circuit 320 may include a second state controller 321 and a second synchronizer 322. The second state controller 321 may be configured to receive an in-band write activation signal ib_wen and output an in-band transmission signal ib_send to the second synchronizer 322 depending on the presence or absence of the eFuse busy signal ef_busy. The second state controller 321 may receive an in-band response signal ib_ack from the second synchronizer 322 and output an in-band busy signal ib_busy to the fixed priority module 340. The second synchronizer 322 may be configured to output an in-band register write activation signal reg_ib_wen in response to the in-band transmission signal ib_send. The second synchronizer 322 may output an in-band response signal ib_ack to the second state controller 321.

The third synchronization control circuit 330 may include a third state controller 331 and a third synchronizer 332. The third state controller 331 may be configured to receive a sideband write activation signal sbb_wen and to output the sideband transmission signal sbb_send to the third synchronizer 332 depending on the presence or absence of the eFuse busy signal ef_busy or the in-band busy signal ib_busy. The third state controller 331 may receive a sideband response signal sbb_ack from the third synchronizer 332 and output a sideband busy signal sbb_busy to the fixed priority module 340. The third synchronizer 332 may be configured to output a sideband register write activation signal reg_sbb_wen in response to the sideband transmission signal sbb_send. The third synchronizer 332 may output a sideband response signal sbb_ack to the third state controller 331.

The fixed priority module 340 may be configured to receive an eFuse register write activation signal reg_ef_wen from the first synchronization control circuit 310, an in-band register write activation signal reg_ib_wen from the second synchronization control circuit 320, and a sideband register write activation signal reg_sbb_wen from the third synchronization control circuit 330 and to output any one of the eFuse register write activation signal reg_ef_wen, the in-band register write activation signal reg_ib_wen, and the sideband register write activation signal reg_sbb_wen as the register write activation signal reg_wen.

The fixed priority module 340 may include a first logic circuit 341, a second logic circuit 342, and a third logic circuit 343.

The first logic circuit 341 may be configured to output a register write activation signal reg_wen by performing an OR operation on the eFuse register write activation signal reg_ef_wen of the first synchronization control circuit 310, the In-band register write activation signal reg_ib_wen of the second synchronization control circuit 320, and the sideband register write activation signal reg_sbb_wen of the third synchronization control circuit 330.

The second logic circuit 342 may be configured to receive the eFuse busy signal ef_busy of the first synchronization control circuit 310 and output the received signal to the second synchronizer 322 of the second synchronization control circuit 320.

The third logic circuit 343 may be configured to perform an OR operation on the eFuse busy signal ef_busy of the first synchronization control circuit 310 and the in-band busy signal ib_busy of the second synchronization control circuit 320, and to output a signal corresponding to the operation result to the third synchronizer 332 of the third synchronization control circuit 330.

Figure 6:
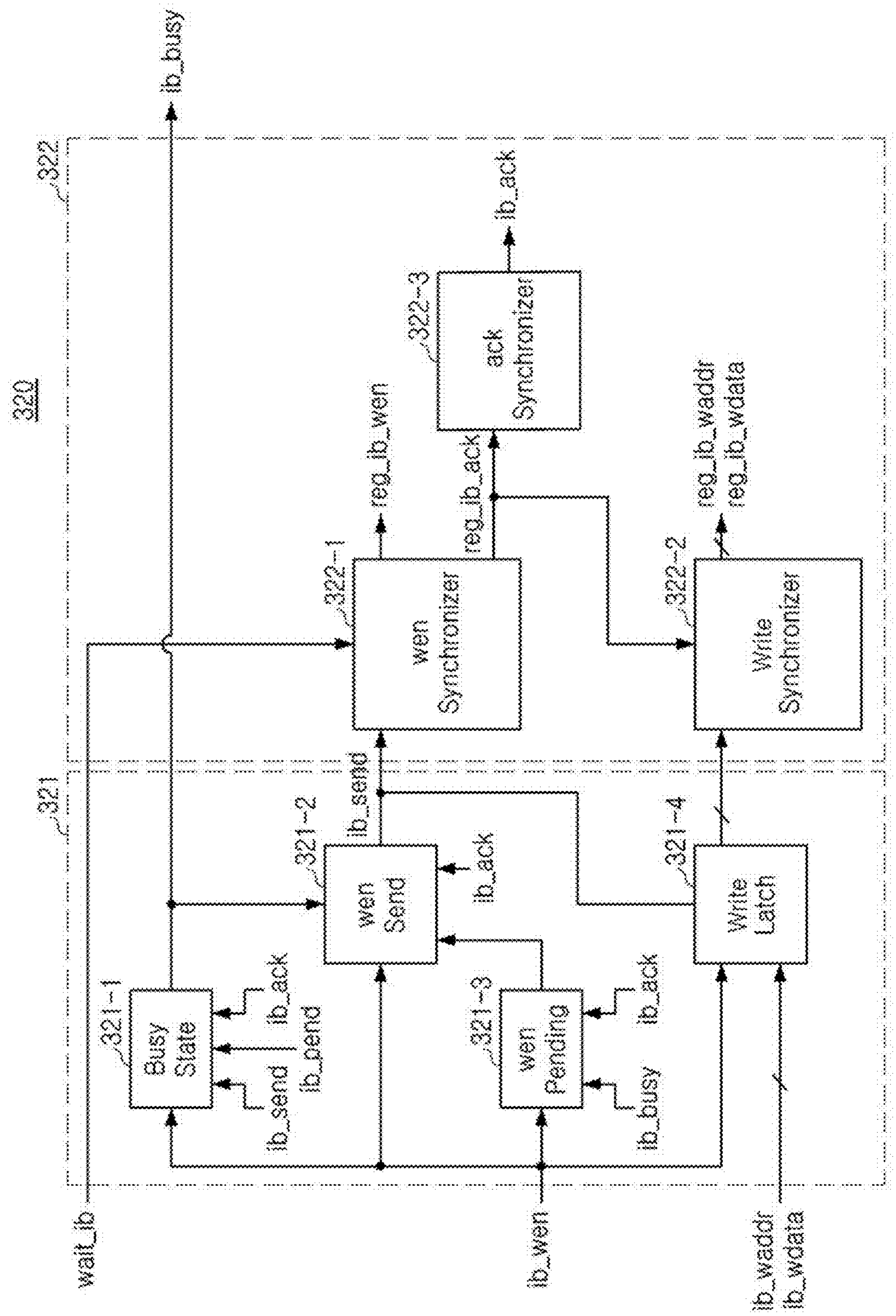
FIG. 6 is a diagram illustrating a second synchronization control circuit according to an example embodiment.

FIG. 6 is a diagram illustrating the second synchronization control circuit 320 according to an example embodiment. Referring to FIG. 6, the second synchronization control circuit 320 may include a second state controller 321 and a second synchronizer 322.

The second state controller 321 may include a busy state logic circuit 321-1, a write activation signal transmission logic circuit 321-2, a write activation signal pending logic circuit 321-3, and a write latch 321-4.

The busy state logic circuit 321-1 may be configured to receive an in-band write activation signal ib_wen and to output an in-band busy signal ib_busy in response to an in-band transmission signal ib_send, an in-band pending signal ib_pend, and an in-band response signal ib_ack.

The write activation signal transmission logic circuit 321-2 may be configured to receive an in-band write activation signal ib_wen and to output an in-band transmission signal ib_send in response to an in-band busy signal ib_busy, an in-band pending signal ib_pend, and an in-band response signal ib_ack.

The write activation signal pending logic circuit 321-3 may be configured to receive an in-band write activation signal ib_wen and to output an in-band pending signal ib_pend in response to an in-band busy signal ib_busy and an in-band response signal ib_ack.

The write latch 321-4 may be configured to receive an in-band write address signal ib_waddr/in-band write data signal ib_wdata and to output an in-band write address signal ib_waddr/in-band write data signal ib_wdata in response to an in-band write activation signal ib_wen and an in-band transmission signal ib_send.

The state controller 321 may control access and pending state by signals received from the interface. If there is no previous access in progress, the in-band write activation signal ib_wen may be received from the inband interface and the busy block may be made busy. In embodiments, the busy block may be made busy by setting the in-band busy signal ib_busy as active (e.g., having a logical value of one ('1') or a logical high value). In addition, the in-band write activation signal ib_wen signal may be transmitted using the in-band transmission signal ib_send.

The second synchronizer 322 may include a write activation signal synchronizer 322-1, a write synchronizer 322-2, and a response signal synchronizer 322-3.

The write activation signal synchronizer 322-1 may be configured to receive an in-band transmission signal ib_send and to output an in-band register write activation signal reg_ib_wen and an in-band register response signal reg_ib_ack in response to the in-band wait signal wait_ib.

The write synchronizer 322-2 may be configured to output the in-band write address signal ib_waddr and the in-band write data signal ib_wdata as the in-band register write address signal reg_ib_waddr and the in-band register write data signal reg_ib_wdata, in response to the in-band register response signal reg_ib_ack.

The response signal synchronizer 322-3 may be configured to receive an in-band register response signal reg_ib_ack and output an in-band response signal ib_ack.

The second synchronizer 322 may receive the in-band transmission signal ib_send and, if the in-band wait signal wait_ib is inactive (e.g., having a logical value of zero ('0') or a logical low value), generates an in-band register write activation signal reg_ib_wen, which may be a source access signal, using a wen synchronizer. If eFuse, which has a higher priority than inband, is attempting access, the in-band wait signal wait_ib is active (e.g., has a logical value of one ('1') or a logical high value) and the wen synchronizer may not be able to sample the in-band transmission signal ib_send, and the in-band register write activation signal reg_ib_wen may be not generated. As the signal is transmitted to the source through the in-band register write activation signal reg_ib_wen, the in-band response signal ib_ack signal is also transmitted to the state controller to clear the busy state.

If in-band busy signal ib_busy is active and ib_wen is received from the inband interface, it enters a pending state and the in-band pending signal ib_pend becomes active. When the previous access is completed, in-band busy signal ib_busy may be maintained as active through the in-band pending signal ib_pend, and the in-band transmission signal ib_send may become active again to attempt access. The address ib_waddr of the register to be accessed and the data signals ib_wdata are latched in the waddr/wdata latch flop when in_wen is active, and may be transferred to the waddr/wdata synchronizer when the in-band transmission signal ib_send is active. This also applies to pending data According to embodiments, the first synchronization control circuit 310 and the third synchronization control circuit 330 may be implemented in the same manner as the second synchronization control circuit 320 described above.

Figure 7:
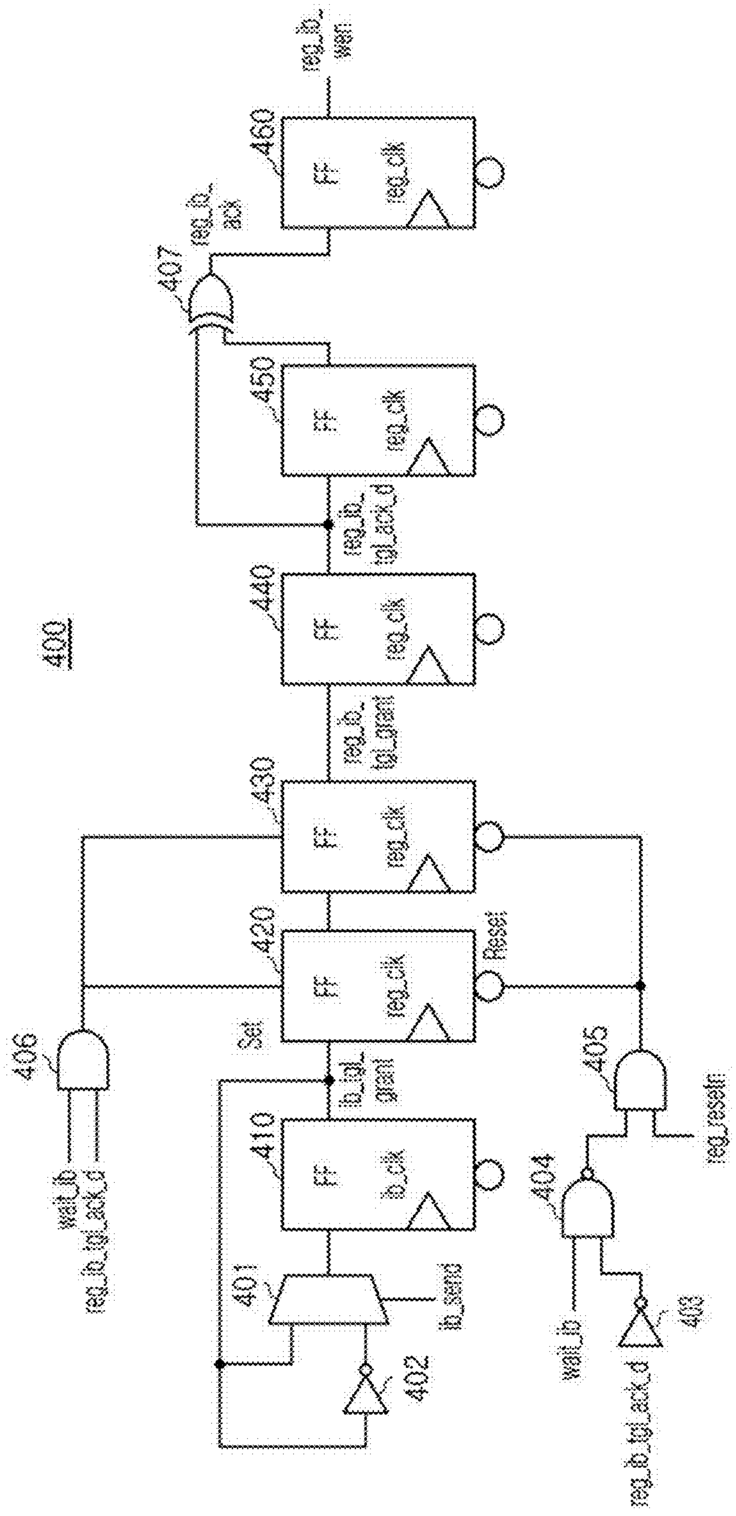
FIG. 7 is a diagram illustrating a write activation signal synchronizer according to an example embodiment.

FIG. 7 is a diagram illustrating a write activation signal synchronizer 400 according to an example embodiment. Referring to FIG. 7, the activation signal synchronizer 400 may include a plurality of logic circuits (e.g., logic circuit 401, logic circuit 402, logic circuit 403, logic circuit 404, logic circuit 405, logic circuit 406, and logic circuit 407) and a plurality of flip-flops (e.g., first flip-flop 410, second flip-flop 420, third flip-flop 430, fourth flip-flop 440, fifth flip-flop 450, and sixth flip-flop 460).

The logic circuit 401 may output either an in-band toggle grant signal ib_tgl_grant or an inverted in-band toggle grant signal ib_tgl_grant in response to the in-band transmission signal ib_send. The logic circuit 402 may invert the in-band toggle grant signal ib_tgl_grant. The logic circuit 403 may invert the in-band toggle register response signal reg_ib_tgl_ack_d. The logic circuit 404 may perform a NAND operation on the output of the logic circuit 403 and the in-band wait signal wait_ib. The logic circuit 405 may output a reset signal by performing an AND operation on the output of the logic circuit 404 and the register reset signal reg_resetn. The logic circuit 406 may output a set signal by performing an AND operation on the in-band wait signal wait_ib and the in-band toggle register response signal reg_ib_tgl_ack_d. The logic circuit 407 may output an in-band register response signal reg_ib_ack by performing an XOR operation on the output signal of the fourth flip-flop 440 (e.g., the the in-band toggle register response signal reg_ib_tgl_ack_d) and the output of the fourth flip-flop 440.

The first flip-flop 410 may output an in-band toggle grant signal ib_tgl_grant in response to the in-band clock ib_clk.

The second flip-flop 420 may synchronize the in-band toggle grant signal ib_tgl_grant of the first flip-flop 410 in response to the register clock reg_clk.

The third flip-flop 430 may synchronize the output of the second flip-flop 420 in response to the register clock reg_clk, thereby outputting the synchronized signal as an in-band toggle register grant signal reg_ib_tgl_grant. In an example embodiment, each of the second and third flip-flops 420 and 430 may be reset in response to an output of the logic circuit 405. In an example embodiment, each of the second and third flip-flops 420 and 430 may be set in response to an output of the logic circuit 406.

The fourth flip-flop 440 synchronizes the in-band toggle register grant signal reg_ib_tgl_grant in response to the register clock reg_clk, thereby outputting the synchronized signal as the in-band toggle register response signal reg_ ib_tgl_ack_d.

The fifth flip-flop 450 may synchronize the in-band toggle register response signal reg_ib_tgl_ack_d in response to the register clock reg_clk.

The sixth flip-flop 460 may output an in-band register write activation signal reg_ib_wen by synchronizing the output signal (e.g., the in-band register response signal reg_ib_ack) of the logic circuit 407 in response to the register clock reg_clk.

As illustrated in FIG. 7, the activation signal synchronizer 400 may generate the in-band register write activation signal reg_ib_wen, which may be a register access signal, through the in-band toggle register response signal reg_ib_tgl_a-ck_d. The in-band toggle grant signal ib_tgl_grant may be transmitted to the register clock domain while having a value inverted each time the in-band transmission signal ib_send is received. The inversion of the in-band toggle register response signal reg_ib_tgl_ack_d signal may mean that the register clock domain has received the signal of the inband clock domain. For example, the fact that the in-band toggle register response signal reg_ib_gl_ack_d is inverted may mean that inband has succeeded in register access. Therefore, if eFuse access occurs before reg_tgl_grant is delivered to the in-band toggle register response signal reg_ib_tgl_ack_d and the in-band wait signal wait_ib becomes active (for example, logical value '1'), the in-band toggle register grant signal reg_ib_tgl_grant may maintain the in-band toggle register response signal reg_ib_tgl_ack_d which may be the value before inversion. For example, if the in-band toggle register response signal reg_ib_tgl_ack_d is active and in-band wait signal wait_ib is active, the synchronizer flip-flop may be set as active and the in-band toggle register grant signal reg_ib_tgl_grant may remain active. Because there is no value change in reg_ib_tgl_a-ck_d, this may mean that inband did not succeed in register access. When in-band wait signal wait_ib is cleared (e.g., set to inactive or having logical value '0'), the in-band toggle register grant signal reg_ib_tgl_grant receives the value of the in-band toggle grant signal ib_tgl_grant again, to be transmitted to the in-band toggle register response signal reg_ib_tgl_ack_d, thereby performing register access.

As illustrated in FIG. 7, the activation signal synchronizer 400 may perform an arbitration function and simultaneously reduce the burden of the combinational logic on the next stage. According to embodiments, the priority of the clock interface may be set to eFuse>inband>sideband.

Figure 8:
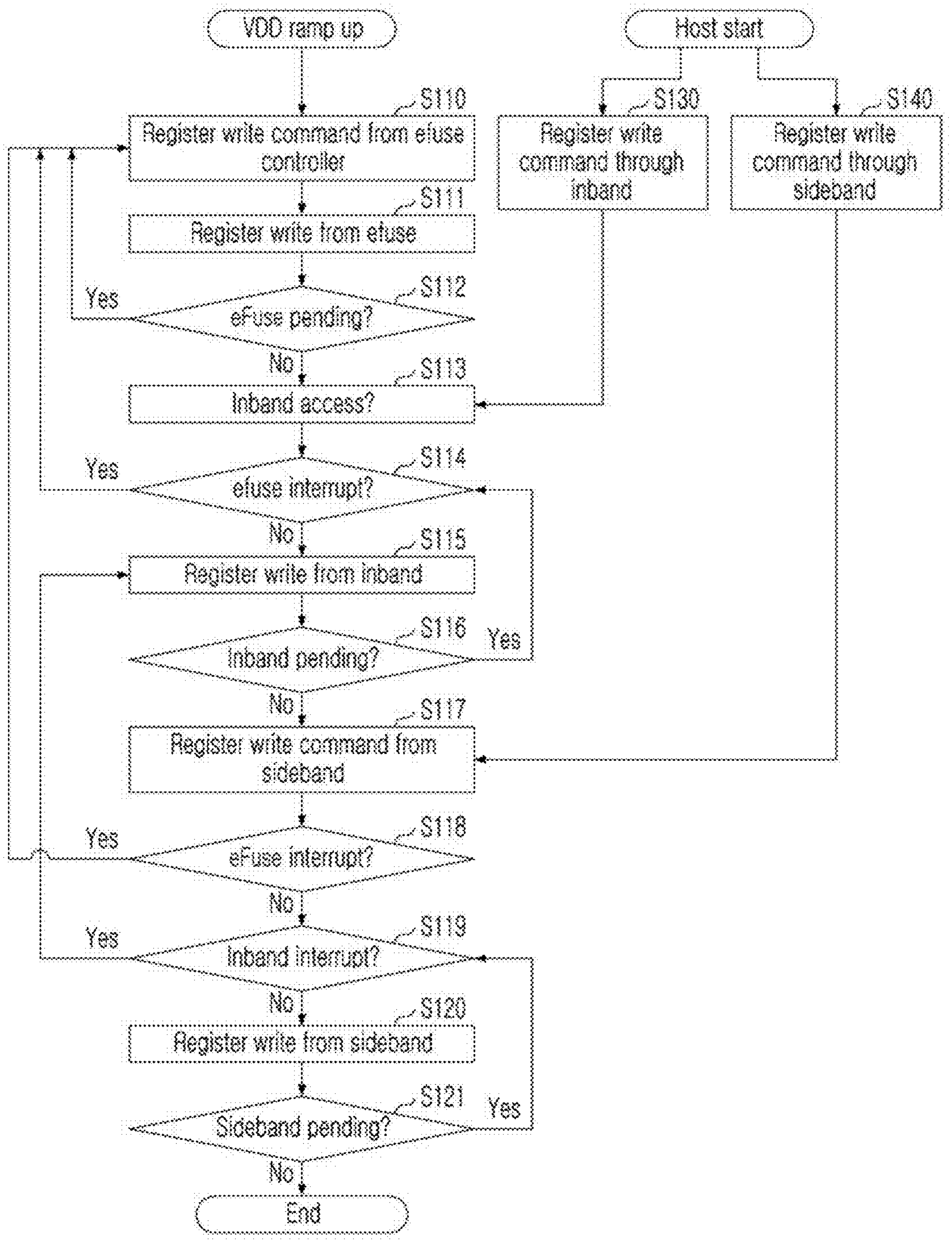
FIG. 8 is a flowchart illustrating the operation of a memory module according to an example embodiment.

FIG. 8 is a flowchart illustrating the operation of a memory module according to an example embodiment, by way of example. In FIG. 8, the register access process is illustrated when the eFuse interface has a higher priority than the in-band interface and the in-band interface has a higher priority than the sideband interface.

When the memory module is powered on (VDD ramp up), register access may be initiated from the eFuse controller. A register write command (first register write command) may be received from the eFuse controller at operation S110. Register writing may proceed from the eFuse interface at operation S111. It may be determined whether the eFuse interface is pending at operation S112. If the eFuse interface is not pending, in-band access may proceed at operation S113. Subsequently, it may be determined whether there is an eFuse interrupt at operation S114. If there is an eFuse interrupt, operation S111 may be performed. However, if there is no eFuse interrupt, register writing may proceed from the in-band interface at operation S115. It may be determined whether the in-band interface is pending at operation S116. If the in-band interface is pending, operation S114 may begin. However, if the in-band interface is not pending, a register write command (e.g., a third register write command) may be received from the sideband interface at operation S117. Subsequently, it may be determined whether there is an eFuse interrupt at operation S118. If there is an eFuse interrupt, operation S111 may be entered. However, if there is no eFuse interrupt, it may be determined whether there is an inband interrupt at operation S119. If there is an in-band interrupt, operation S115 may be entered. However, if there is no in-band interrupt, register writing may proceed from the sideband interface at operation S120. Subsequently, it may be determined whether the sideband interface is pending at operation S121. If the sideband interface is pending, operation S118 may be entered. However, if the sideband interface is not pending, the register access operation may be terminated.

The host device may attempt register access independent of eFuse operation. The host device may transmit a register write command (e.g., a second register write command) to the memory module through the in-band interface at operation S130. Subsequently, operation S113 may be entered. Additionally, the host device may transmit a register write command (e.g., a third register write command) to the memory module through the sideband interface at operation S140. Subsequently, operation S117 may be entered. At this time, if the eFuse controller is accessing a register, it may wait until it is finished and then try accessing the in-band or side-band register.

According to some embodiments, the register access operation illustrated in FIG. 8 may be performed in the order of eFuse interface, in-band interface, and sideband interface. However, it should be understood that the register access order is not limited thereto. For example, the register access according to some embodiments may also be performed in the order of an eFuse interface, sideband interface, and inband interface.

Figure 9:
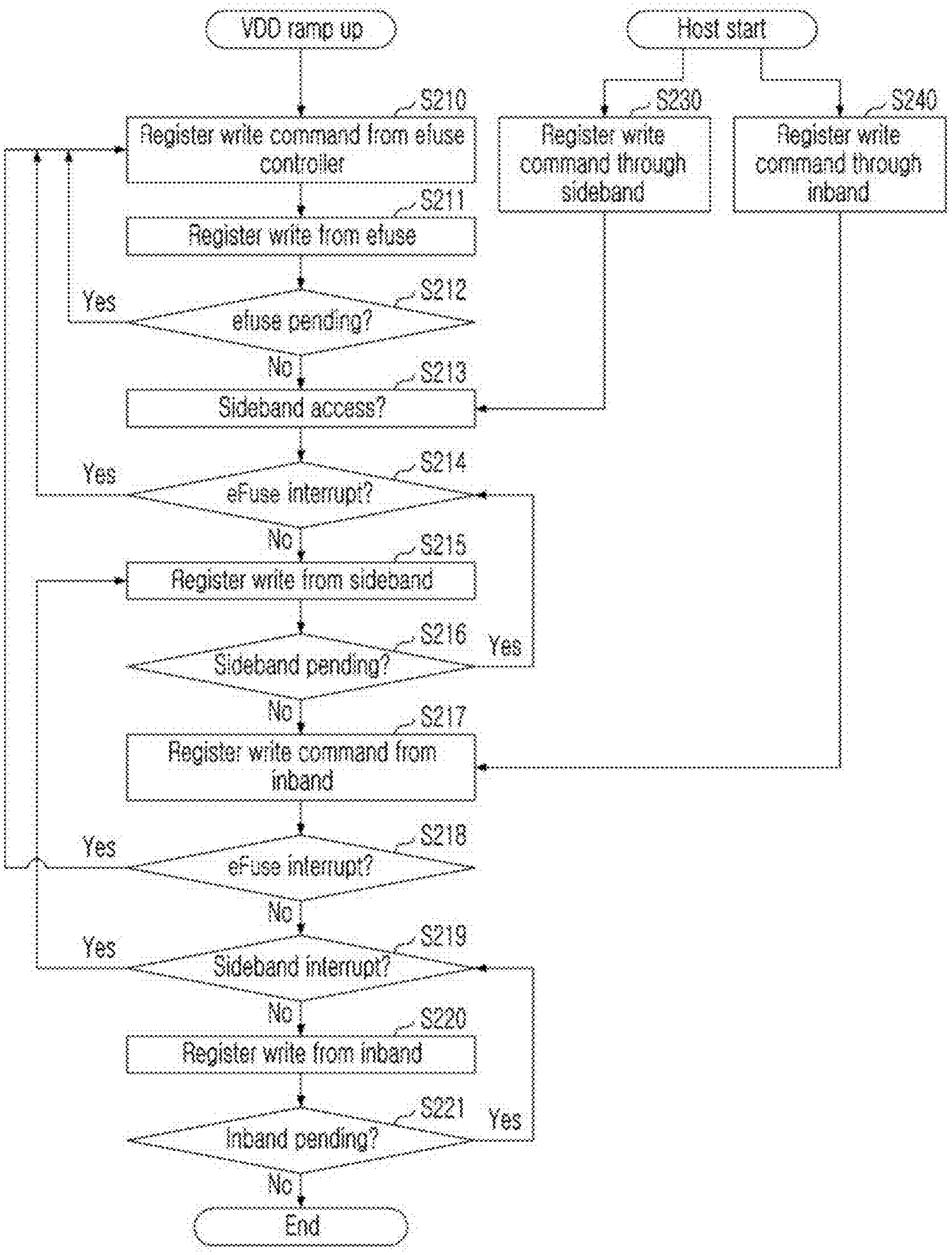
FIG. 9 is a flowchart illustrating the operation of a memory module according to another embodiment, by way of example.

FIG. 9 is a flowchart illustrating the operation of a memory module according to another embodiment, by way of example. In FIG. 9, the register access process is illustrated when the eFuse interface has a higher priority than the sideband interface and the sideband interface has a higher priority than the inband interface.

When the memory module is powered on, register access may be initiated from the eFuse controller. A register write command may be received from the eFuse controller at operation S210. Register writing may proceed from the eFuse interface at operation S211. It may be determined whether the eFuse interface is pending at operation S212. If the eFuse interface is not pending, in-band access may proceed at operation S213. Subsequently, it may be determined whether there is an eFuse interrupt at operation S214. If there is an eFuse interrupt, operation S111 may be entered. However, if there is no eFuse interrupt, register writing may proceed from the sideband interface at operation S215). It may be determined whether the sideband interface is pending at operation S216. If the sideband interface is pending, operation S214 may be entered. However, if the sideband interface is not pending, a register write command may be received from the inband interface at operation S217. Subsequently, it may be determined whether there is an eFuse interrupt at operation S218. If there is an eFuse interrupt, operation S211 may be entered. However, if there is no eFuse interrupt, it may be determined whether there is a sideband interrupt at operation S219. If there is a sideband interrupt, operation S215 may be entered. However, if there is no sideband interrupt, register writing may proceed from the in-band interface at operation S220. Subsequently, it may be determined whether the in-band interface is pending at operation S221. If the in-band interface is pending, operation S218 may be entered. However, if the in-band interface is not pending, the register access operation may be terminated.

The host device may transmit a register write command to the memory module through the sideband interface at operation S230. Subsequently, operation S213 may be entered. Additionally, the host device may transmit a register write command to the memory module through the in-band interface at operation S240. Subsequently, operation S217 may be entered.

Figure 10:
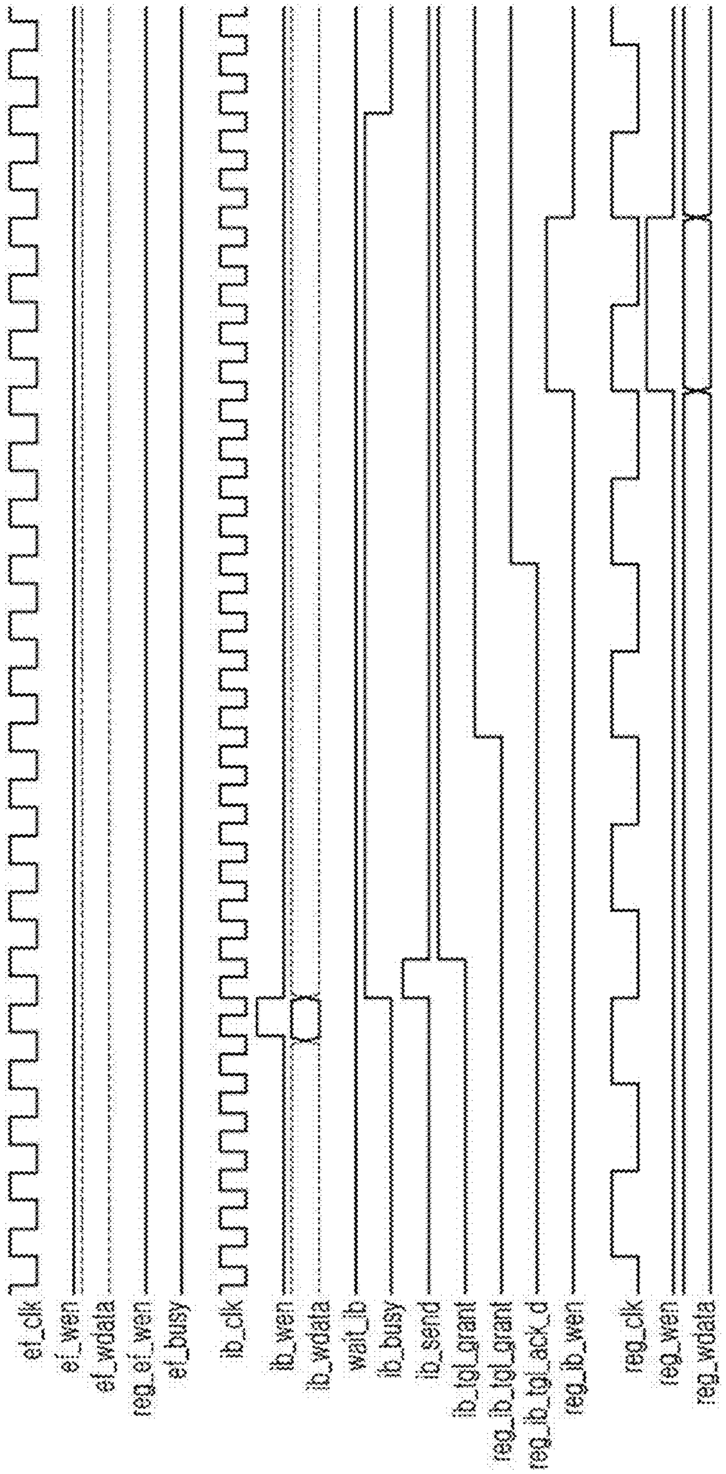
FIG. 10 is a diagram illustrating an in-band access waveform of a memory module according to an example embodiment.

FIG. 10 is a diagram illustrating an in-band access waveform of a memory module according to an example embodiment. This is an example where there is no high-priority eFuse interrupt (e.g., in-band wait signal wait_ib) in low-priority inband access. Since ef_busy is not active high, the in-band toggle register grant signal reg_ib_tgl_grant signal may be synchronized to the reg_clk domain. Therefore, the register bus may be occupied by inband.

Figure 11:
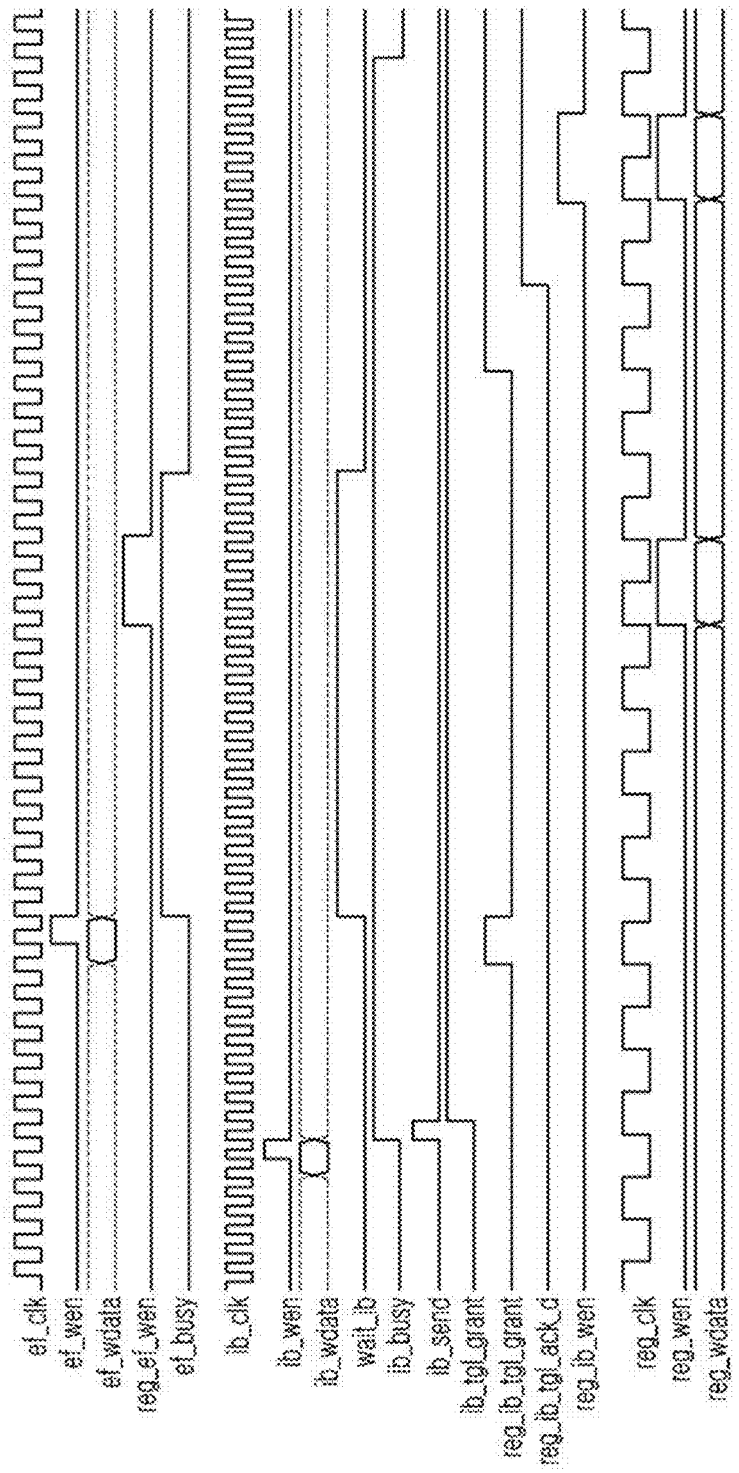
FIG. 11 is a diagram illustrating occurrence of an eFuse interrupt during in-band access of a memory module according to an example embodiment.

FIG. 11 is a diagram illustrating the occurrence of an eFuse interrupt (flip-flop reset) during in-band access of a memory module according to an example embodiment, by way of example. This is an example when a high-priority eFuse interrupt (e.g., in-band wait signal wait_ib) occurs during a low-priority inband access, but the in-band toggle register response signal reg_ib_tgl_ack_d is inactive. Inband attempts access first, and the in-band toggle register grant signal reg_ib_tgl_grant is toggled and set to be high, but an eFuse interrupt occurs before being delivered to the in-band toggle register response signal reg_ib_tgl_ack_d, and ef_busy(wait_ib) becomes active, and the in-band toggle register grant signal reg_ib_tgl_grant is reset to a previous value, for example reset to inactive (e.g., logical low or a value of zero ('0')). Therefore, the register bus may be taken by eFuse, and after access(reg_ef_wen) is completed, ef_busy is cleared, the inband toggle register grant signal reg_ib_tgl_grant takes the value of the in-band toggle grant signal ib_tgl_grant again, and the in-band toggle register response signal reg_ib_tgl_ack_d may be toggled. The fact that the in-band toggle register response signal reg_ib_tgl_ack_d is toggled may mean that access is accepted, and then inband may access the register (e.g., using the in-band register write activation signal reg_ib_wen).

Figure 12:
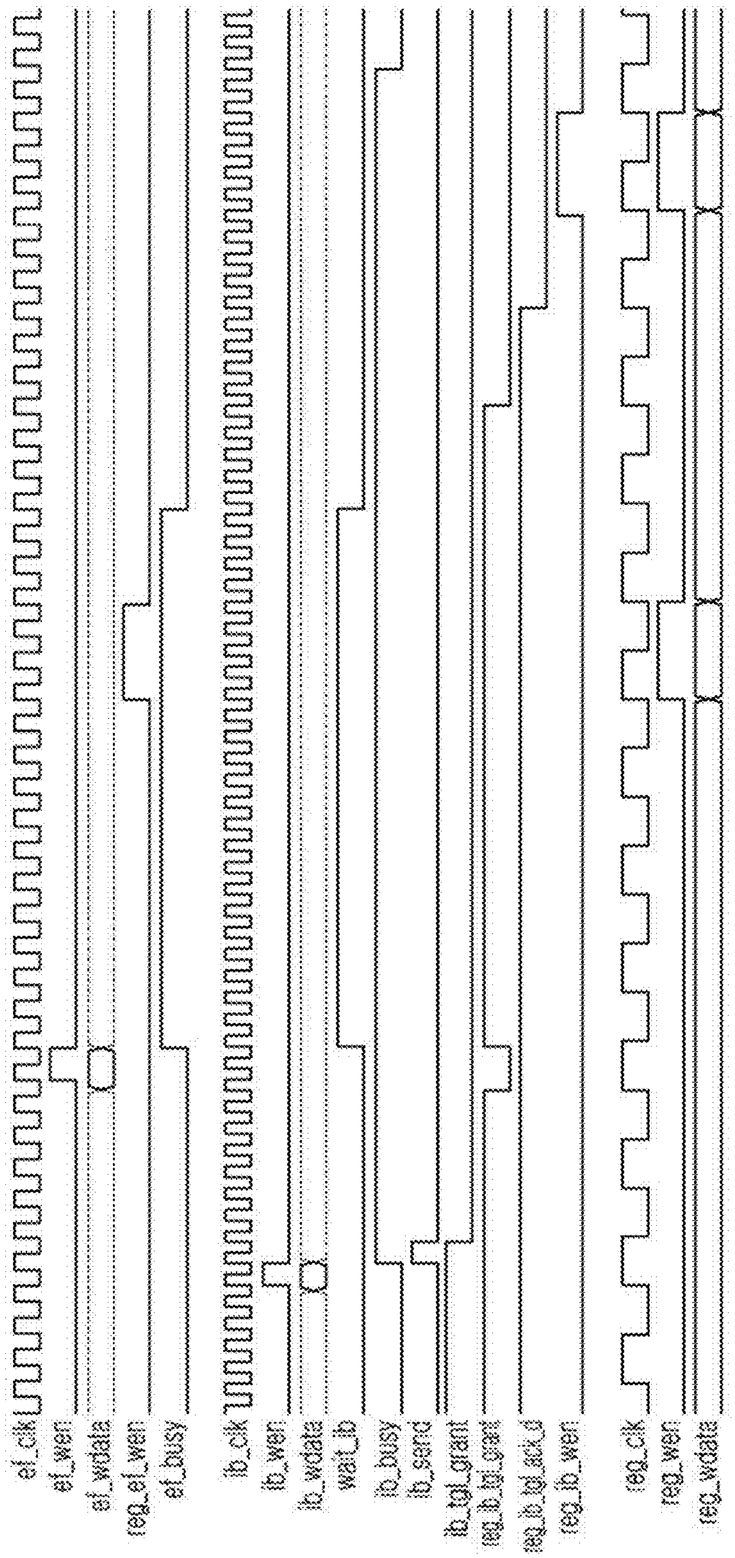
FIG. 12 is a diagram illustrating occurrence of an eFuse interrupt during in-band access of a memory module according to an example embodiment.

FIG. 12 is a diagram illustrating the occurrence of an eFuse interrupt (flip-flop set) during in-band access of a memory module according to an example embodiment, by way of example. This is an example when a high-priority eFuse interrupt (e.g., an active in-band wait signal wait_ib (1)) occurs during a low-priority inband access and the in-band toggle register response signal reg_ib_tgl_ack_d is active. Inband may attempt access first, and the in-band toggle register grant signal reg_ib_tgl_grant may be toggled and set to inactive, but an eFuse interrupt may occur before being delivered to the in-band toggle register response signal reg_ib_tgl_ack_d, ef_busy(wait_ib) may become active, and the in-band toggle register grant signal reg_ib_tgl_grant may be set to its previous value, for example reset to active (e.g., logical high or a value of one ('1')). Therefore, the register bus may be taken by eFuse, and after access is completed, ef_busy may be cleared, the in-band toggle register grant signal reg_ib_tgl_grant may take the value of the in-band toggle grant signal ib_tgl_grant value again, and the in-band toggle register response signal reg_ib_tgl_ack_d may be toggled. The fact that the in-band toggle register response signal reg_ib_tgl_ack_d is toggled may mean that access is accepted, and then inband may access the register (e.g., using the in-band register write activation signal reg_ib_wen).

Figure 13:
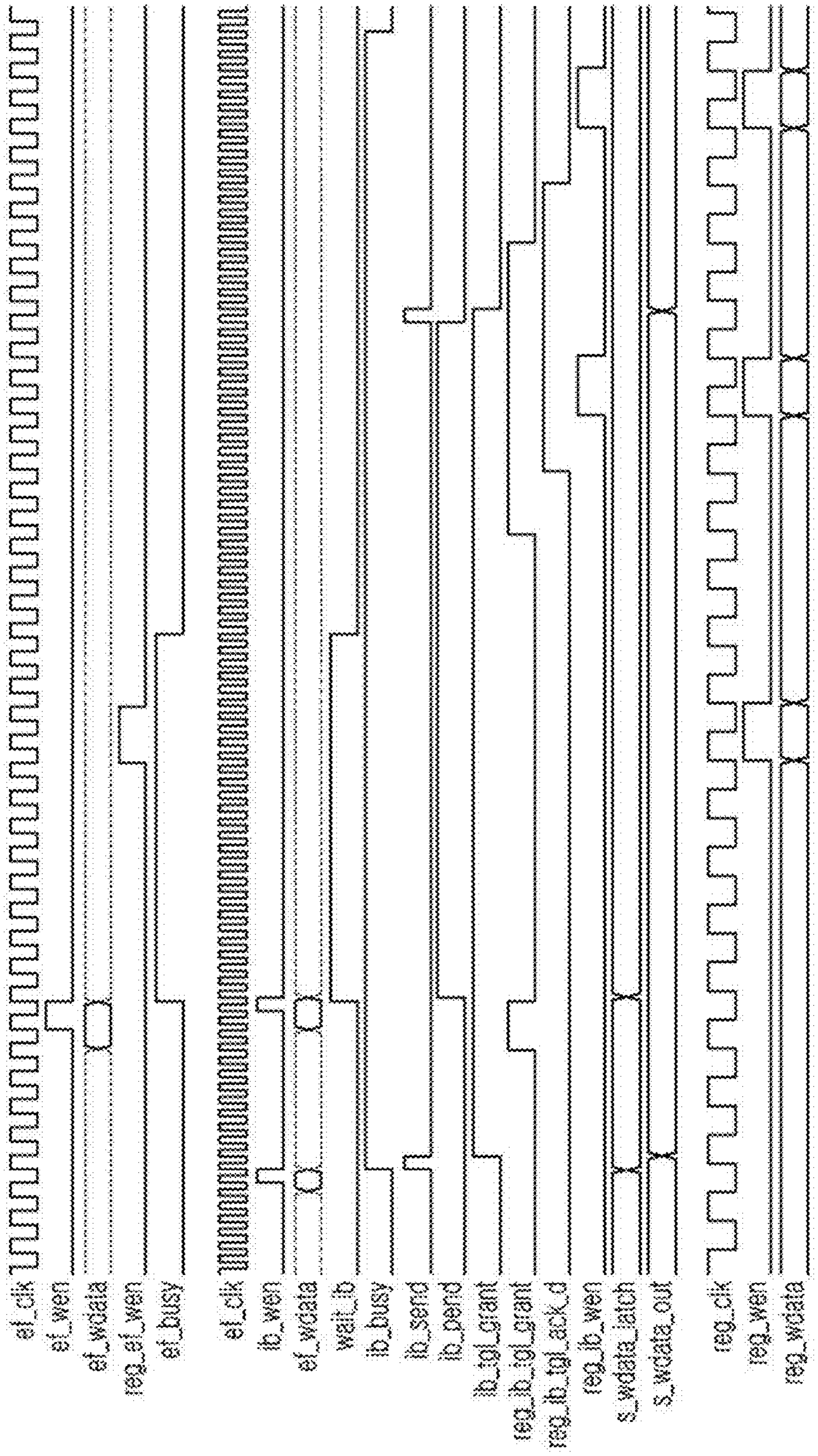
FIG. 13 is a diagram illustrating occurrence of eFuse interrupts and pending during in-band access of a memory module according to an example embodiment.

FIG. 13 is a diagram illustrating the occurrence of eFuse interrupts and pending during in-band access of a memory module according to an example embodiment. This is an example of a case where a high-priority eFuse interrupt (e.g., an active in-band wait signal wait_ib(1)) occurs during low-priority inband access and the access is not completed, but inband access is attempted again. As illustrated in FIG. 9, the in-band toggle register grant signal reg_ib_tgl_grant may fail while trying to invert the value and may be waiting for eFuse's register access to end. At this time, inband register access may be attempted again and pending may occur. Therefore, after the in-band pending signal ib_pend is active and the first register access (e.g., using the in-band register write activation signal reg_ib_wen) of the inband is completed, register access may be attempted again and pending access may also be delivered.

Therefore, collisions between interfaces may be prevented in register access and access loss may also be prevented. In comparison with an arbitrator including a synchronizer and a fixed priority module of the arbitrator of some other approaches, embodiments may manage priority register access in the synchronizer. By using asynchronous set and reset in the flip-flop of the synchronizer to allow low-priority interfaces to wait, bus conflicts between interfaces may be prevented.

Additionally, a state controller may be added to the input stage to manage pending status. The send signal may mean that a wen signal is valid, and if access is not completed within one interface and access is attempted again, it will not be active. Instead, by setting a separate pending signal to be managed as pending within the same interface, the pending register access may be delivered by generating a send signal through the pending signal when the previous access is completed. Depending on the design, the number of pendings may change.

Embodiments may be applicable to Low Power Compression Attached Memory Module (LPCAMM).

Figure 14:
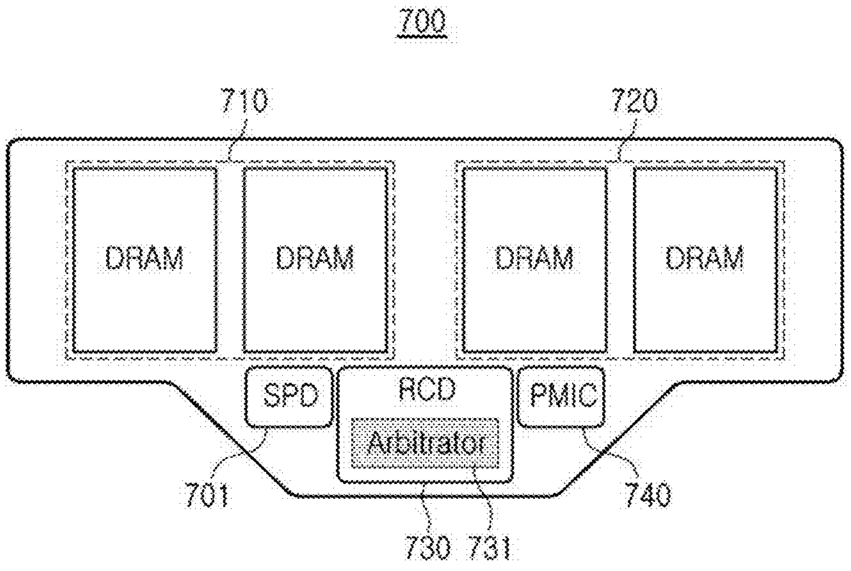
FIG. 14 is a diagram illustrating a memory module according to an example embodiment.

FIG. 14 is a diagram illustrating a memory module according to an example embodiment. Referring to FIG. 14, a memory module 700 may include a serial presence detect (SPD) 701, a first rank 710, a second rank 720, a register clock driver chip (RCD) 730, and a power management integrated circuit (PMIC) chip 740.

Two memory channels may be included for each memory rank. Each memory channel may include two memory chips DRAM dedicated to storing data. In this case, it should be understood that the number of memory chips is not limited. Additionally, each of the first rank 710 and the second rank 720 may be implemented as an amplifier with low input capacitance and adjustable bandwidth.

The SPD chip 701 may include device information of the memory module 700. By way of example, the SPD chip 701 may include initial information or device information such as module type, module configuration, storage capacity, module type, execution environment, and the like of the memory module 700. When the memory module 700 is booted, the memory controller may read device information from the SPD chip 701 of the memory module 700 and recognize the memory module 700 based on the read device information. The memory controller may control the memory module 700 based on the device information from the SPD chip 701.

The RCD chip 730 may be configured to control the first and second ranks 710 and 720 and the PMIC chip 740 under the control of a memory controller. For example, the RCD chip 730 may receive commands, addresses, clock signals, and control signals from the memory controller through the memory bus, and may perform a buffer function to distribute the received signals to the first memory channel and the second memory channel. The memory chips of respective memory channels may exchange data with the memory controller in response to commands, addresses, clock signals, and control signals provided from the RCD chip 730.

Additionally, the RCD chip 730 may include a synchronization arbitrator 731 (which may be, for example, referred to as a synchronous arbitrator) that mediates register access of three or more clock interfaces, as described in FIGS. 1 to 13.

The PMIC chip 740 may configured to provide power voltages used by for the SPD chip 701, the first rank 710, the second rank 720, and the RCD chip 730. The PMIC chip 740 may generate a power voltage based on the input voltage and provide the generated power voltage to memory chips. Memory chips may operate based on power supply voltage.

Figure 15:
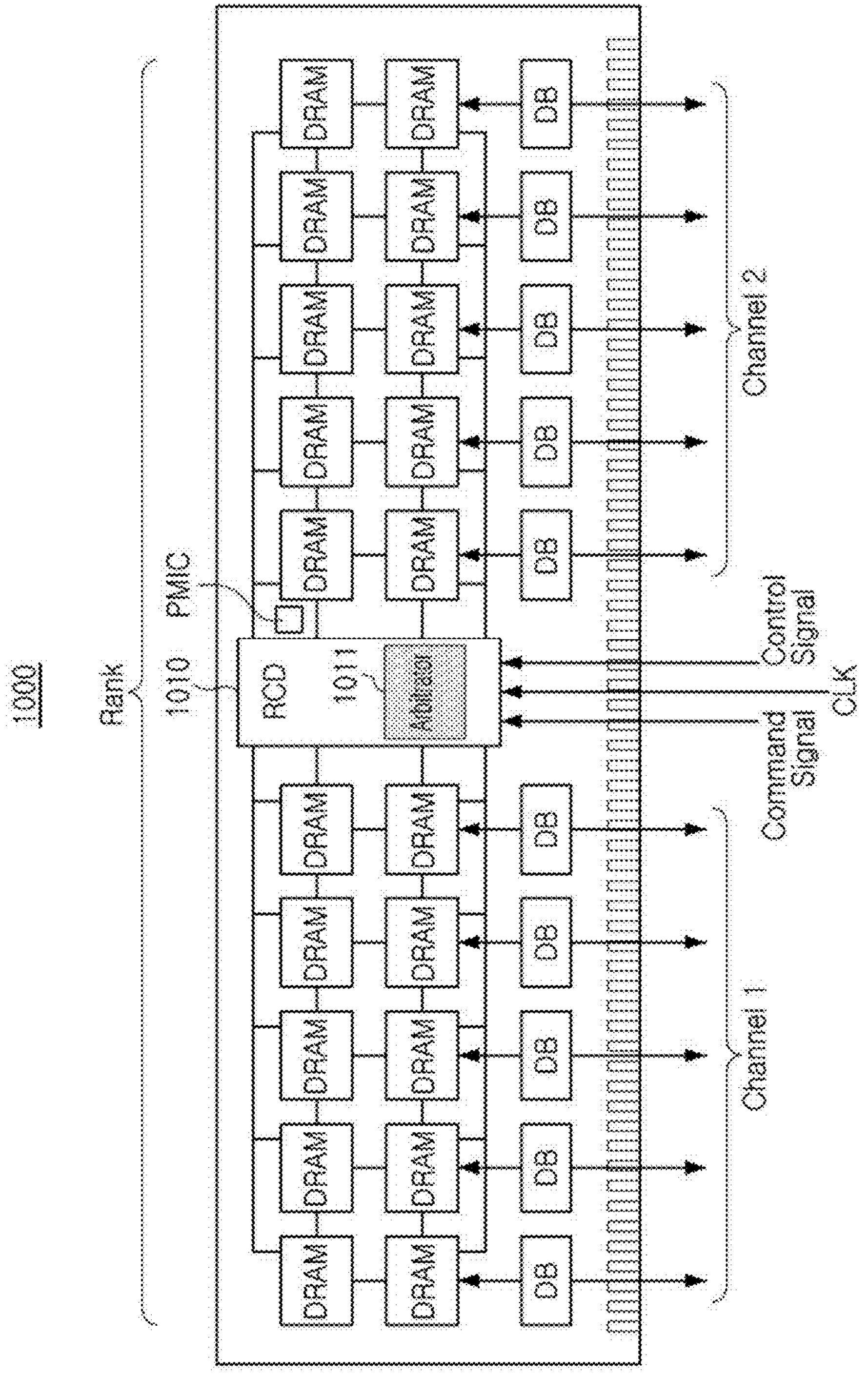
FIG. 15 is a diagram illustrating a memory module according to an example embodiment.

FIG. 15 is an example diagram illustrating a memory module 1000 according to an example embodiment. Referring to FIG. 15, the memory module 1000 may include a plurality of memory chips DRAM each including a memory cell array, and a buffer chip (RCD) 1010 and a Power Management Chip PMIC, for routing transmission and reception signals with the memory controller or managing memory operations for memory chips. The buffer chip 1010 may include a synchronous arbitrator 1011 configured to mediate register access according to three or more clock interfaces, as described in FIGS. 1 to 13.

The buffer chip 1010 may control memory chips DRAM and a power management chip PMIC according to the control of the memory controller. For example, the buffer chip 1010 may receive command signals, control signals, and clock signals from the memory controller. The memory chips DRAM are each connected to a corresponding data buffer among the data buffers DB through a corresponding data transmission line and may exchange a data signal DQ and a data strobe signal. Memory chips DRAM are respectively connected to the data buffer DB through corresponding data transmission lines to exchange parity data and data strobe signals.

The SPD chip may be an Electrically Erasable and Programmable Read-Only Memory (EEPROM). The SPD chip may include initial information or device information of the memory module 1000. By way of example, the SPD chip may include initial information or device information such as the module type of the memory module, module configuration, storage capacity, module type, execution environment, and the like. When the memory system including the memory module 1000 is booted, the memory controller may read device information from the SPD chip and recognize the memory module based on the read device information. In an example embodiment, a rank may include 8 bank groups. Each of the bank groups may include four banks. In an example embodiment, the memory chips may be divided into memory chips dedicated to the first channel and memory chips dedicated to the second channel.

Figure 16:
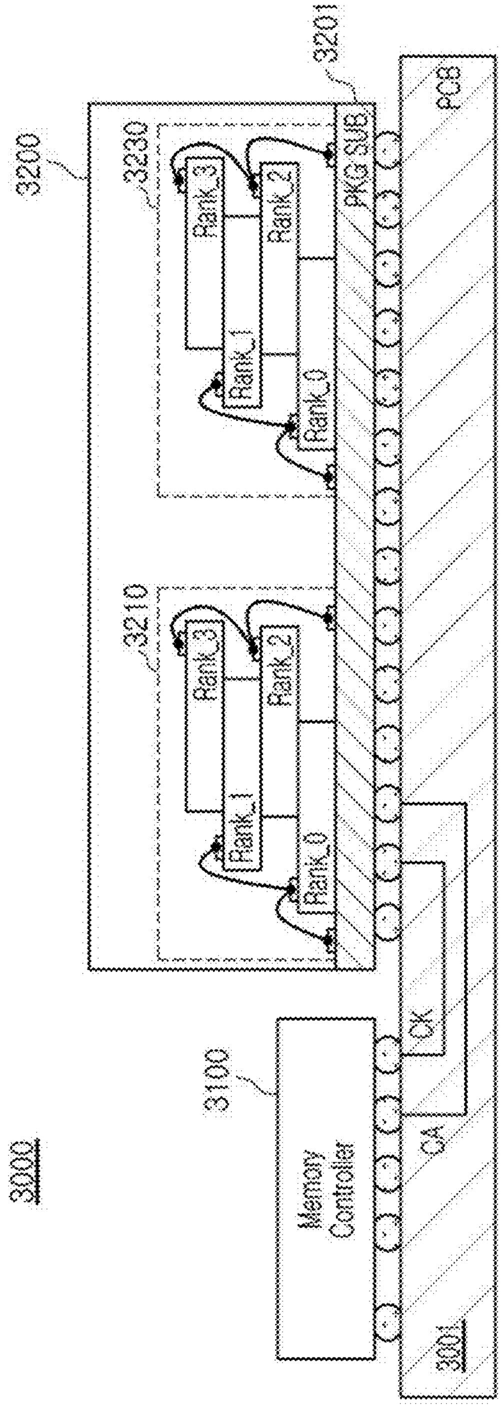
FIG. 16 is a diagram illustrating a memory system according to an example embodiment.

FIG. 16 is an example diagram illustrating a memory system according to an example embodiment. Referring to FIG. 16, a memory system 3000 may include a memory controller 3100 and a memory module 3200. The memory module 3200 may include multilayer memory devices 3210 and 3230 each including four ranks.

The memory controller 3100 may write data to the memory module 3200 or perform an access operation to read data stored in the memory module 3200. The memory controller 3100 may write data to the memory module 3200 or generate a command CMD and an address ADDR for reading data stored in the memory module 3200. The memory controller 3100 may be at least one of a chipset for controlling the memory module 3200, a system-on-chip (SoC) such as a mobile application processor (AP), CPU, GPU, DPU, or neural processing unit (NPU).

The memory module 3200 may include a plurality of stacked memory devices corresponding to multi-ranks Rank0, Rank1, Rank2 and Rank3. The four stacked memory devices 3210 may respectively share a command/address signal CA and a clock signal CK in a 2-rank structure. The four stacked memory devices 3210 may respectively have a structure in which two ranks constitute one channel and may be connected to the memory controller 3100. For example, the first rank Rank0 and the second rank Rank1 in the memory devices 3210 may be connected through wire bonding to share the command/address signal CA and the clock signal CK. Additionally, the third rank Rank2 and the fourth rank Rank3 may be connected through wire bonding to share the command/address signal CA and the clock signal CK. Memory devices 3230 may also be connected to the memory controller 3100, with the same rank structure as the memory devices 3210. Additionally, the memory module 3200 may include a register clock driver that controls register access according to three or more types of clock interfaces, as described in FIGS. 1 to 13.

Embodiments may be applicable to HBM (High Bandwidth Memory)-PIM (Processing-in-Memory).

Figure 17:
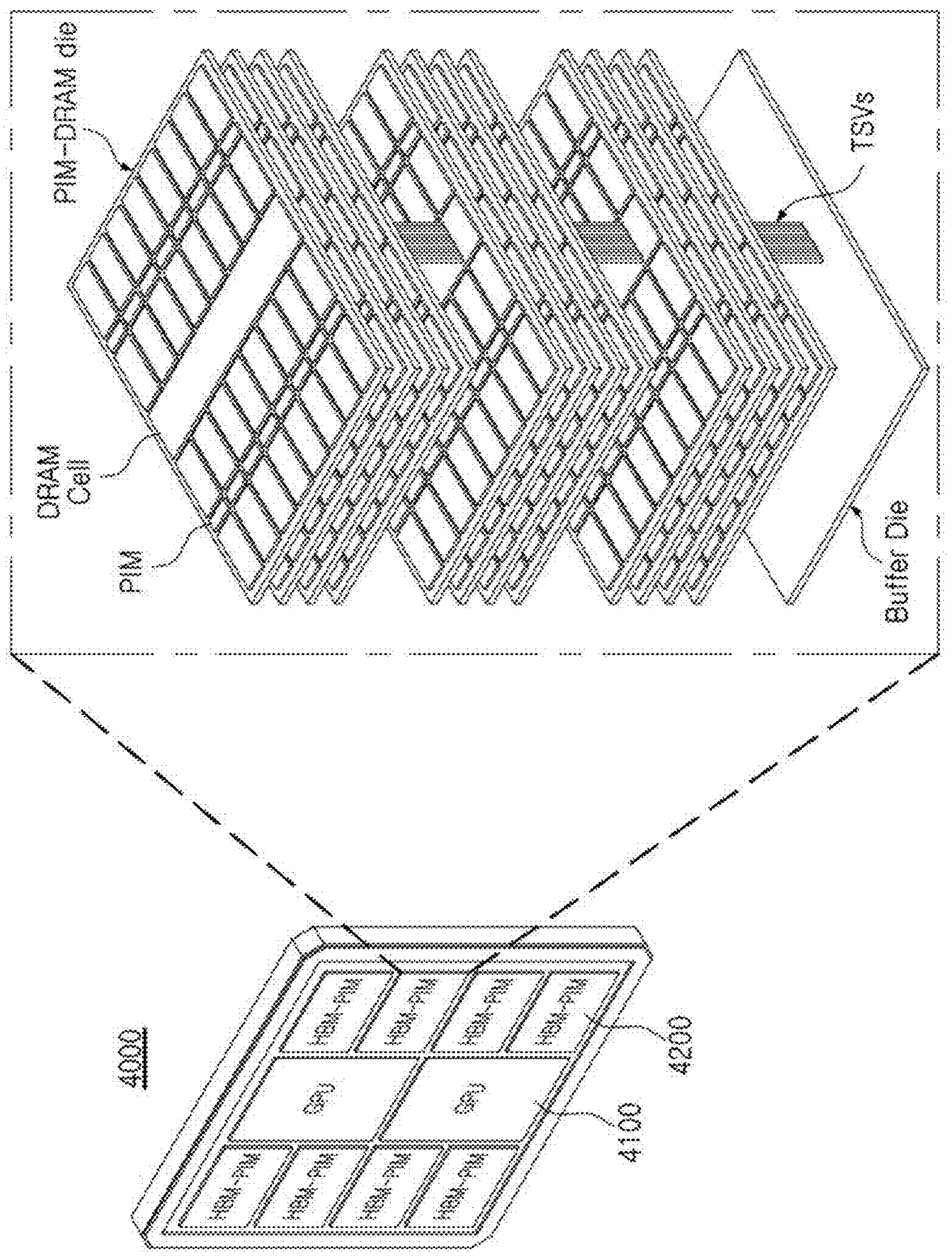
FIG. 17 is a diagram illustrating an on-device chip according to an example embodiment.

FIG. 17 is an example diagram illustrating an on-device chip according to an example embodiment. Referring to FIG. 17, an on-device chip 4000 may include at least one processing unit 4200, for example a graphics processing unit (GPU), and at least one memory device 4200, for example a High Bandwidth Memory-Processing-in-Memory (HBM-PIM) processing device. The processing unit 4100 may be a processor that processes data. The memory device 4200 may be configured to store data or process data. The memory device 4200 may include a buffer die and a plurality of layers disposed on the buffer die. Each of the plurality of layers may include a DRAM cell and a PIM. In an example embodiment, layers of a stacked structure may be connected to each other through Silicon Via (TSV). The buffer die communicates with the processing unit 4100 and may route transmission and reception signals between layers and the processing unit 4100. Furthermore, the buffer die may queue signals received from the processing unit 4100 or layers. Additionally, the buffer die may include a training block. The buffer die may perform training operations on layers using training blocks.

The device described above may be implemented with hardware components, software components, and/or a combination of hardware components and software components. For example, the devices and components described in the example embodiments may be implemented using one or more general-purpose computers or special-purpose computers, such as processors, controllers, arithmetic logic units (ALUs), digital signal processors, microcomputers, field programmable gate arrays (FPGAs), programmable logic units (PLUs), microprocessors, or any other devices capable of executing and responding to instructions. The processing device may execute an operating system (OS) and one or more software applications running on the operating system. Additionally, a processing device may access, store, manipulate, process, and generate data in response to the execution of software. For ease of understanding, one processing device may be described as being used in some cases, but those skilled in the art will appreciate that a processing device may include a plurality of processing elements or multiple types of processing elements. For example, a processing device may include a plurality of processors or one processor and one controller. Additionally, other processing configurations, such as parallel processors, may also be used.

Software may include computer programs, code, instructions, or a combination of one or more thereof, and may configure a processing device to operate as required or, independently or in combination, instruct a processing device. Software and/or data may be embodied in any type of machine, component, physical device, virtual device, computer storage medium or device, to be interpreted by or to provide instructions or data to a processing device. Software may be distributed over networked computer systems and stored or executed in a distributed manner. Software and data may be stored on one or more computer-readable recording media.

The arbitrator for register access used in some RCDs may use a multiplexer structure, and thus, access from low-priority interfaces may be ignored in arbitration situations. In the case of a general arbitrator, the module that determines priority becomes more complex as the number of interfaces increases. RCD according to an example embodiment maintains the request within the arbitrator until the register access of the interface is successfully completed. The RCD according to an example embodiment adds an arbitration function to the synchronizer required for clock domain crossing of the interface and register block.

Embodiments may provide a synchronous arbitrator for register access from three interfaces of different clock domains of an RCD. While the 3-interface arbitrator according to an example embodiment uses memory inside the RCD, writes data_ib to register addr_ib in inband and continuously performs write access to other registers, when write access is performed to data_sbb to the same register in sideband, data_ib may be stored in register addr_ib until inband access ends, and then data_sbb may be stored when inband access ends. When the arbitrator according to embodiments performs a write access of data_sbb to register addr_ib and then performs a write access of data_sbb2 to register addr_ib2 in the sideband, to use the queue, data_ib is stored in register addr_ib and initial data is stored in addr_ib2 until inband access is completed, and then, when inband access is completed, data_sbb and data_sbb2 may be stored in addr_ib and addr_ib2, respectively.

The synchronizer according to an example embodiment has a difference between the time when changing into the register write value of the inband and the time when changing into the register write value of the sideband when the inband and sideband perform write access to the mode register that may be confirmed externally at the same time, and may operate without data loss even if multiple interfaces access the register simultaneously through arbitration and queue in the RCD Datasheet.

The RCD according to an example embodiment mediates access of three interfaces that may access the register. According to embodiments, when register access is performed simultaneously on two or more interfaces, the access to the resource is first performed at the interface with the highest priority. Embodiments may provide a method in which control signals from three interfaces (e.g., the eFuse interface, the inband interface, and the side-band bus interface) may be transferred from an RCD to an arbitrator, and the signals are transferred from the arbitrator to a register block through arbitration. The arbitrator according to embodiments may transmit all requests to the busy signal through the state controller to the fixed priority module, sets the priority for busy, and transmits it to the synchronizer. Therefore, since only the synchronizer of the high-priority interface performs input sampling, only the access signal of one interface may be generated at a time.

The particular embodiments described above are merely detailed examples. The present disclosure includes not only detailed and practically usable examples, but also technical ideas, which are abstract and conceptual ideas that can be utilized as technology in the future.

As set forth above, in a memory module and a method of operating the same according to an example embodiment, when accessing registers from three or more interfaces simultaneously, a busy signal of a state controller may be transmitted to a fixed priority module to stop a request for a low-priority interface and to allow access to a high-priority interface.

In a memory module and a method of operating the same according to an example embodiment, access to only one interface may be transmitted as a resource at a time.

While some example embodiments are illustrated in the drawings and described above, it will be apparent to those skilled in the art that modifications and variations could be made without departing from the scope of the disclosure as defined by the appended claims.

What is claimed is:

1. A memory module comprising:

a first synchronization control circuit configured to store a first write activation signal, a first write address signal, and a first write data signal, wherein the first synchronization control circuit corresponds to an eFuse interface;

a second synchronization control circuit configured to store a second write activation signal, a second write address signal, and a second write data signal;

a third synchronization control circuit configured to store a third write activation signal, a third write address signal, and a third write data signal; and a fixed priority module configured to:
output a write activation signal received from the first synchronization control circuit, the second synchronization control circuit, or the third synchronization control circuit as a register write activation signal,
output a write address signal received from the first synchronization control circuit, the second synchronization control circuit, or the third synchronization control circuit as a register write address signal, and
output a write data signal received from the first synchronization control circuit, the second synchronization control circuit, or the third synchronization control circuit as a register write data signal.

2. The memory module of claim 1,
wherein the second synchronization control circuit corresponds to an inband interface, and
wherein the third synchronization control circuit corresponds to a sideband interface.

3. The memory module of claim 2, wherein the first synchronization control circuit is further configured to transmit an eFuse busy signal to the fixed priority module.

4. The memory module of claim 2, wherein the second synchronization control circuit is further configured to transmit an in-band busy signal to the fixed priority module, and to receive an in-band wait signal from the fixed priority module.

5. The memory module of claim 2, wherein the third synchronization control circuit is further configured to transmit a sideband busy signal to the fixed priority module, and to receive a sideband wait signal from the fixed priority module.

6. The memory module of claim 1, wherein each of the first synchronization control circuit, the second synchronization control circuit, and the third synchronization control circuit comprises:
a state controller configured to receive a write activation signal of a corresponding interface, and to output an interface transmission signal based on receiving an interface response signal; and
a synchronizer configured to receive the interface transmission signal, and to output an interface register write activation signal and the interface response signal by synchronizing the write activation signal.

7. The memory module of claim 6, wherein the fixed priority module comprises:
a first logic circuit configured to:
execute a first OR operation on one from among a first register write activation signal corresponding to the first synchronization control circuit, a second register write activation signal corresponding to the second synchronization control circuit, and a third register write activation signal corresponding to the third synchronization control circuit, and
output a result of the first OR operation as the register write activation signal;
a second logic circuit configured to receive a first interface busy signal from the first synchronization control circuit, and to output the received first interface busy signal to the second synchronization control circuit; and
a third logic circuit configured to execute a second OR operation on the first interface busy signal and a second interface busy signal received from the second synchronization control circuit, and to output a result of the second OR operation to the third synchronization control circuit.

8. The memory module of claim 7, wherein the state controller comprises:
a busy state logic circuit configured to receive the write activation signal of the corresponding interface, and to output an interface busy signal based on receiving the interface transmission signal, an interface pending signal, and the interface response signal;
a write activation signal transmission logic circuit configured to receive the write activation signal of the corresponding interface, and to output the interface transmission signal based on receiving the interface busy signal, the interface pending signal, and the interface response signal;
a write activation signal pending logic circuit configured to receive the write activation signal of the corresponding interface, and to output the interface pending signal based on receiving the interface busy signal and the interface response signal; and
a write latch configured to receive an interface write address signal and an interface data signal, and to output the interface write address signal and the interface data signal based on receiving the interface write activation signal and the interface transmission signal.

9. The memory module of claim 8, wherein the synchronizer comprises
a write activation signal synchronizer configured to receive the interface transmission signal, and to output the interface register write activation signal and an interface register response signal based on receiving an interface wait signal;
a write signal synchronizer configured to receive the interface write address signal and the interface write data signal, and to output an interface register write address signal and an interface register write data signal based on receiving the interface register response signal; and
a response signal synchronizer configured to receive the interface register response signal, and to output the interface response signal by synchronizing the received interface register response signal.

10. The memory module of claim 9, wherein the write activation signal synchronizer is configured to generate an inband register write activation signal using an inband register clock response signal,
wherein the inband register write activation signal comprises a register access signal.

11. A method of operating a memory module, comprising:
receiving a first register write command from an eFuse controller;
receiving a second register write command from a host device using an in-band interface; and
receiving a third register write command from the host device using a sideband interface,
wherein register access is processed in order of the first register write command, the second register write command, and the third register write command.

12. The method of claim 11, further comprising:
performing a register write corresponding to the eFuse controller;
determining whether to set an eFuse interface corresponding to the eFuse controller as pending;
allowing access from the in-band interface when the eFuse interface is not pending;
determining whether a first eFuse interrupt occurs;
performing a register write corresponding to the in-band interface based on determining that the first eFuse interrupt does not occur; and determining whether to set the in-band interface as pending.

13. The method of claim 12, further comprising:

receiving a register write command from the sideband interface when the in-band interface is not pending;

determining whether a second eFuse interrupt occurs;

determining whether an in-band interrupt occurs based on determining that the second eFuse interrupt does not occur;

performing a register write corresponding to the sideband interface based on determining that the in-band interrupt does not occur; and determining whether to set the sideband interface as pending.

14. The method of claim 13, further comprising:

determining whether the second eFuse interrupt occurs when the sideband interface is pending; and performing a register write corresponding to the eFuse controller based on determining that the first eFuse interrupt or the second eFuse interrupt occurs.

15. The method of claim 13, further comprising:

performing a register write corresponding to the in-band interface based on determining that the in-band interrupt occurs.

16. A method of operating a memory module, comprising:

receiving a first register write command corresponding to an eFuse controller;

receiving a second register write command corresponding to a host device using an in-band interface; and receiving a third register write command corresponding to the host device using a sideband interface, wherein register access is processed in an order of the first register write command, the third register write command, and the second register write command.

17. The method of claim 16, further comprising:

performing a register write corresponding to the eFuse controller;

determining whether to set an eFuse interface corresponding to the eFuse controller as pending;

allowing access from the sideband interface when the eFuse interface is not pending;

determining whether a first eFuse interrupt occurs;

performing a register write from the sideband interface based on determining that the first eFuse interrupt does not occur; and determining whether to set the sideband interface as pending.

18. The method of claim 17, further comprising:

receiving a second register write command from the in-band interface when the sideband interface is not pending;

determining whether a second eFuse interrupt occurs;

determining whether a sideband interrupt occurs based on determining that the second eFuse interrupt does not occur;

performing a register write corresponding to the in-band interface based on determining that the sideband interrupt does not occur; and determining whether to set the in-band interface as pending.

19. The method of claim 18, further comprising:

determining whether the second eFuse interrupt occurs while the in-band interface is pending; and performing a register write from the eFuse controller based on determining that the first eFuse interrupt or the second eFuse interrupt occurs.

20. The method of claim 18, further comprising:

performing a register write corresponding to the sideband interface based on determining that the sideband interrupt occurs.

* * * * *